United States Patent
Tsai et al.

(10) Patent No.: US 8,743,477 B2
(45) Date of Patent: Jun. 3, 2014

(54) OPTICAL PHOTOGRAPHING LENS SYSTEM

(71) Applicant: Largan Precision Co., Ltd., Taichung (TW)

(72) Inventors: Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 47 days.

(21) Appl. No.: 13/712,524

(22) Filed: Dec. 12, 2012

(65) Prior Publication Data
US 2014/0118844 A1    May 1, 2014

(30) Foreign Application Priority Data
Oct. 30, 2012   (TW) .............................. 101140062 A

(51) Int. Cl.
*G02B 3/02* (2006.01)
*G02B 13/00* (2006.01)

(52) U.S. Cl.
CPC .................................. *G02B 13/0045* (2013.01)
USPC ........................................................ 359/713

(58) Field of Classification Search
USPC ........................................................ 359/713
See application file for complete search history.

(56) References Cited

U.S. PATENT DOCUMENTS 8,248,713 B2    8/2012  Hsieh et al.
2012/0188654 A1 *  7/2012  Huang ........................... 359/713

* cited by examiner

*Primary Examiner* — James Jones
(74) *Attorney, Agent, or Firm* — Morris, Manning & Martin, LLP; Tim Tingkang Xia, Esq.

(57) ABSTRACT

An optical photographing lens system includes, in order from an object side to an image side, a first lens element, a second lens element, a third lens element, a fourth lens element, a fifth lens element and a sixth lens element. The first lens element with negative refractive power has a convex object-side surface and a concave image-side surface. The second lens element has positive refractive power. The third lens element has refractive power. The fourth lens element has refractive power, wherein at least one surface of the fourth lens element is aspheric. The fifth lens element with positive refractive power has a convex image-side surface and both of the surfaces are aspheric. The sixth lens element with negative refractive power has an image-side surface changing from concave at a paraxial region to convex at a peripheral region, and both of the surfaces are aspheric.

22 Claims, 16 Drawing Sheets

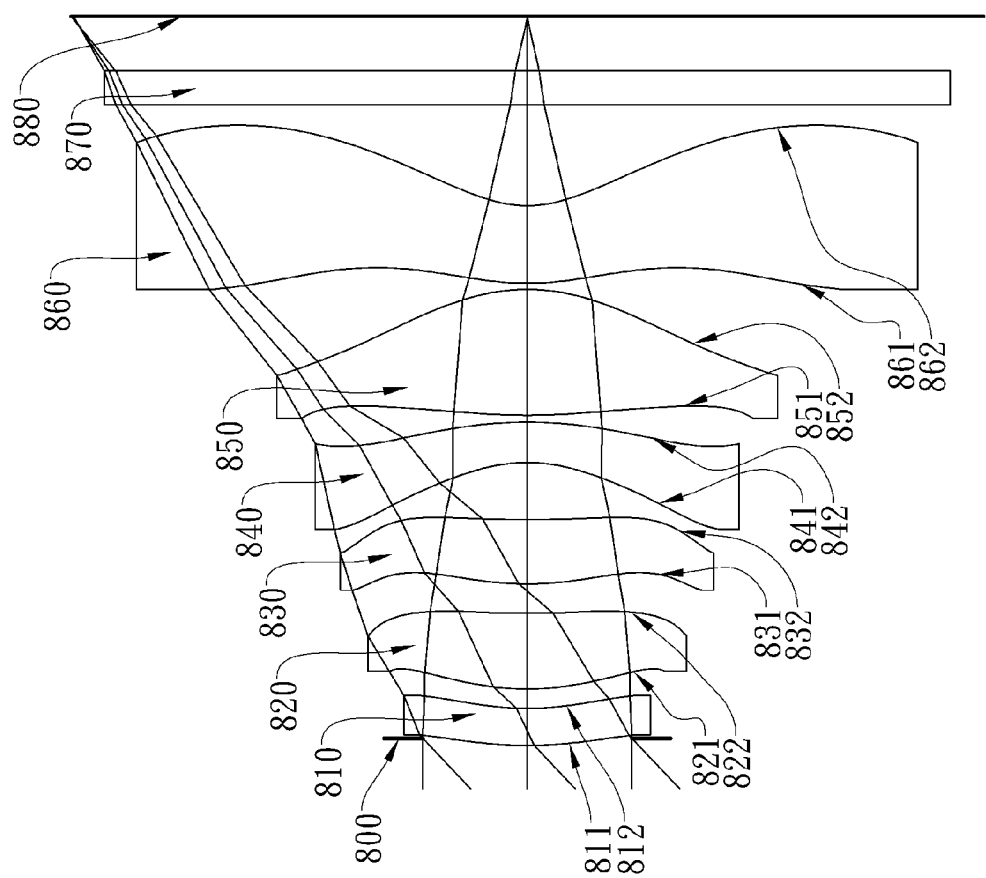

OPTICAL PHOTOGRAPHING LENS SYSTEM

RELATED APPLICATIONS

The application claims priority to Taiwan Application Serial Number 101140062, filed Oct. 30, 2012, which is herein incorporated by reference.

BACKGROUND

1. Technical Field

The present invention relates to an optical photographing lens system. More particularly, the present invention relates to a compact optical photographing lens system applicable to the electronic products.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

Imaging lenses used in vehicle cameras, security surveillance cameras or electronic game devices typically require a larger field of view to capture an image of a larger area at one time. Generally, a conventional imaging lens assembly with a large angle of view, such as the five-element lens assembly disclosed in U.S. Pat. No. 8,248,713, is a negative-positive structure, thereby forming an inverse telephoto structure to achieve a wide field of view. While such arrangement facilitates the enlargement of the field of view, the image resolving power is insufficient and the total track of length is not easy to be reduced.

Although other conventional imaging lens assembly with six-element lens structure is favorable for improving the image resolving power, such as the one disclosed in U.S. Publication No. 2012/0188654. However, the two lens elements of the imaging lens assembly closest to the object side are not configured as the traditional one with negative refractive power and the other with greater positive refractive power, so that the back focal length of imaging lens assembly cannot be reduced. As a result, although it is favorable for reducing the total track of length, it is not favorable for enlarging the field of view to capture an image of a larger area at one time.

SUMMARY

According to one aspect of the present disclosure, an optical photographing lens system includes, in order from an object side to an image side, a first lens element, a second lens element, a third lens element, a fourth lens element, a fifth lens element and a sixth lens element. The first lens element with negative refractive power has a convex object-side surface and a concave image-side surface. The second lens element has positive refractive power. The third lens element has refractive power. The fourth lens element has refractive power, wherein at least one surface of the fourth lens element is aspheric. The fifth lens element with positive refractive power has a convex image-side surface and both of the surfaces are aspheric. The sixth lens element with negative refractive power has an image-side surface changing from concave at a paraxial region to convex at a peripheral region, and both of the surfaces are aspheric. When a focal length of the optical photographing lens system is f, a focal length of the second lens element is f2, a curvature radius of the object-side surface of the fifth lens element is R9, and a curvature radius of the image-side surface of the fifth lens element is R10, the following relationships are satisfied: $0<f/f2<1.0$; and $|R10/R9|<0.9$.

BRIEF DESCRIPTION OF THE DRAWINGS

The disclosure can be more fully understood by reading the following detailed description of the embodiments, with reference made to the accompanying drawings as follows:

FIG. 8A is a schematic view of an optical photographing lens system according to the 8th embodiment of the present disclosure.

DETAILED DESCRIPTION

Figure 1A:
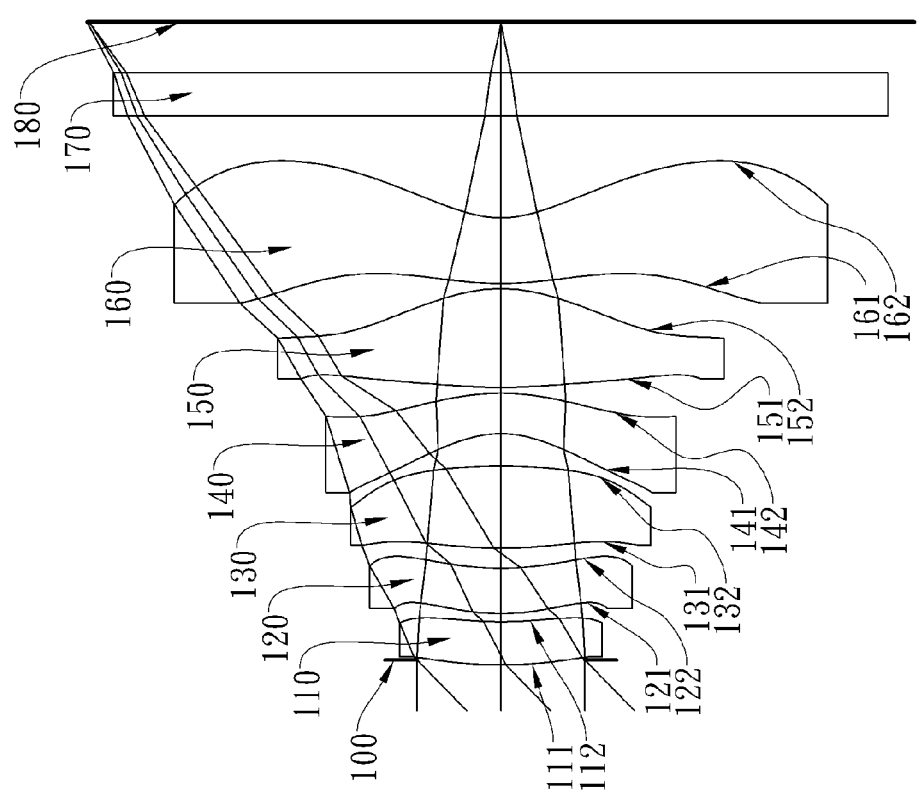
FIG. 1A is a schematic view of an optical photographing lens system according to the 1st embodiment of the present disclosure.

An optical photographing lens system includes, in order from an object side to an image side, a first lens element, a second lens element, a third lens element, a fourth lens element, a fifth lens element and a sixth lens element.

The first lens element with negative refractive power has a convex object-side surface and a concave image-side surface, so that the field of view of the optical photographing lens system can be increased by adjusting the negative refractive power and the curvature of the object-side surface and the image-side surface of the first lens element.

The second lens element has positive refractive power, and is favorable for reducing the total track length of the optical photographing lens system. The second lens element can have a convex object-side surface and a concave image-side surface, so that the astigmatism of the optical photographing lens system can be corrected. In addition, the second lens element can have at least one inflection point formed on at least one of the object-side surface and the image-side surface thereof, and it is favorable for reducing the angle at which the incident light projects onto the image sensor from the off-axis field to improve the image-sensing efficiency and to further correct the aberrations generated from the off-axis field.

The third lens element can have positive refractive power, so that the refractive power of the second lens element can be effectively distributed for reducing the sensitivity and the total track length of the optical photographing lens system. The third lens element can have a convex object-side surface and a convex image-side surface and it is favorable for effectively reducing the total track length of the optical photographing lens system.

The fourth lens element can have negative refractive power, and it is favorable for correcting the astigmatism of the third lens element with positive refractive power. The fourth lens element can have a concave object-side surface and a convex image-side surface. Therefore, the astigmatism of the optical photographing lens system can be corrected.

The fifth lens element can have positive refractive power, and it is favorable for reducing the spherical aberration closer to the object side, reducing astigmatism and balancing the arrangement of the other positive refractive power. The fifth lens element can have a convex image-side surface. Therefore, it is favorable for reducing the total track length of the optical photographing lens system.

The sixth lens element can have negative refractive power. Therefore, the principal point of the optical photographing lens system can be positioned away from the image plane, and the back focal length thereof can be reduced so as to keep the optical photographing lens system compact. Furthermore, the sixth lens element can have a convex object-side surface and a concave image-side surface at a paraxial region and a convex image-side surface at a peripheral region, and the negative refractive power of the sixth lens element becomes weak from the paraxial region to the peripheral region. Therefore, it is favorable for correcting the astigmatism, for reducing the angle at which the incident light projects onto the image sensor from the off-axis field and for further reducing the aberrations generated from the off-axis field.

When a focal length of the optical photographing lens system is f, and a focal length of the second lens element is f2, the following relationship is satisfied: $0<f/f2<1.0$. Therefore, it is favorable for arranging the positive refractive power of the second lens element and reducing the spherical aberration and astigmatism. When a curvature radius of an object-side surface of the fifth lens element is R9, and a curvature radius of an image-side surface of the fifth lens element is R10, the following relationship is satisfied: $|R10/R9|<0.9$. Therefore, it is favorable for reducing the system sensitivity and correcting the aberration to obtain better image quality. Preferably, the following relationship is satisfied: $|R10/R9|<0.4$. Therefore, it is favorable for reducing the spherical aberration, reducing astigmatism and balancing the arrangement of the positive refractive power.

When the focal length of the optical photographing lens system is f, and a composite focal length of the first lens element and the second lens element is f12, the following relationship is satisfied: $0<f/f12<0.6$. Therefore, the negative-positive inverse telephoto structure is favorable for enlarging the field of view to capture an image of a larger area at one time.

When a curvature radius of an image-side surface of the third lens element is R6, and a curvature radius of an object-side surface of the fourth lens element is R7, the following relationship is satisfied: $|R7/R6|<0.5$. Therefore, it is favorable for reducing the system sensitivity, reducing the total track length of the optical photographing lens system and correcting the aberration.

When a composite focal length of the first lens element, the second lens element and the third lens element is f123, and a composite focal length of the fourth lens element, the fifth lens element and the sixth lens element is f456, the following relationship is satisfied: $-1<f123/f456<0.3$. Therefore, it is favorable for reducing the spherical aberration, reducing the astigmatism and correcting the aberration.

When a focal length of the first lens element is f1, the focal length of the second lens element is f2, and a focal length of the third lens element is f3, the following relationship is satisfied: $|f1|>|f2|>|f3|$. Therefore, this arrangement is favorable for reducing the spherical aberration closer to the object side and for reducing the astigmatism to obtain better image quality.

When the curvature radius of the object-side surface of the fourth lens element is R7, and a curvature radius of an image-side surface of the fourth lens element is R8, the following relationship is satisfied: $0.1<|(R7-R8)/(R7+R8)|<0.55$. Therefore, the surface shape of the fourth lens element is favorable for correcting the aberration and reducing the astigmatism.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, a total axial distance of the air intervals between every lens element with refractive power is ΣAT (ΣAT equals to the sum of T12, T23, T34, T45 and T56) and an axial distance between the object-side surface of the first lens element and the image-side surface of the sixth lens element is Td, the following relationship is satisfied: $0<\Sigma AT/Td<0.30$. Therefore, it is favorable for assembling the lens elements and raising the yield rate. Preferably, the following relationship is satisfied: $0<\Sigma AT/Td<0.25$.

When the focal length of the optical photographing lens system is f, a focal length of the fifth lens element is f5, and a focal length of the sixth lens element is f6, the following relationship is satisfied: $2.0<f/f5-f/f6<5.5$. Therefore, it is favorable for correcting and reducing the aberration.

When the focal length of the second lens element is f2, and the focal length of the third lens element is f3, the following relationship is satisfied: $0.2<|f3/f2|<0.7$. Therefore, it is favorable for reducing the sensitivity and the total track length of the optical photographing lens system.

When a curvature radius of an object-side surface of the first lens element is R1, a curvature radius of an image-side surface of the first lens element is R2, a curvature radius of an object-side surface of the second lens element is R3, and a curvature radius of an image-side surface of the second lens element is R4, the following relationship is satisfied: 0.10<|(R1−R2)/(R1+R2)|+|(R3−R4)/(R3+R4)|<0.45. Therefore, it is favorable for making a balance between enlarging the field of view and reducing the total track length.

When a curvature radius of an image-side surface of the sixth lens element is R12, and the focal length of the optical photographing lens system is f, the following relationship is satisfied: 0.10<R12/f<0.50. Therefore, the principal point of the optical photographing lens system can be positioned away from the image plane, and the back focal length thereof can be reduced so as to keep the optical photographing lens system compact.

According to the optical photographing lens system of the present disclosure, the lens elements thereof can be made of plastic or glass material. When the lens elements are made of glass material, the distribution of the refractive power of the optical photographing lens system may be more flexible to design. When the lens elements are made of plastic material, the manufacturing costs can be effectively reduced. Furthermore, the surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the optical photographing lens system can also be reduced.

According to the optical photographing lens system of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the paraxial region of the surface is convex; when the lens element has a concave surface, it indicates that the paraxial region of the surface is concave.

According to the optical photographing lens system of the present disclosure, the optical photographing lens system can include at least one stop, such as an aperture stop, a glare stop, or a field stop. Said glare stop or said field stop is allocated for reducing stray light and thereby improving the image resolution thereof. Furthermore, an aperture stop can be configured as a front stop or a middle stop. A front stop can provide a longer distance between an exit pupil of the system and an image plane and thereby the generated telecentric effect improves the image-sensing efficiency of an image sensor. A middle stop is favorable for enlarging the field of view of the optical photographing lens system and thereby provides a wider field of view for the same.

According to the optical photographing lens system of the present disclosure, the optical photographing lens system is featured with good correcting ability and high image quality, and can be applied to 3D (three-dimensional) image capturing applications, in products such as digital cameras, mobile devices and tablets.

According to the above description of the present disclosure, the following 1st-8th specific embodiments are provided for further explanation.

1st Embodiment

Figure 1B:
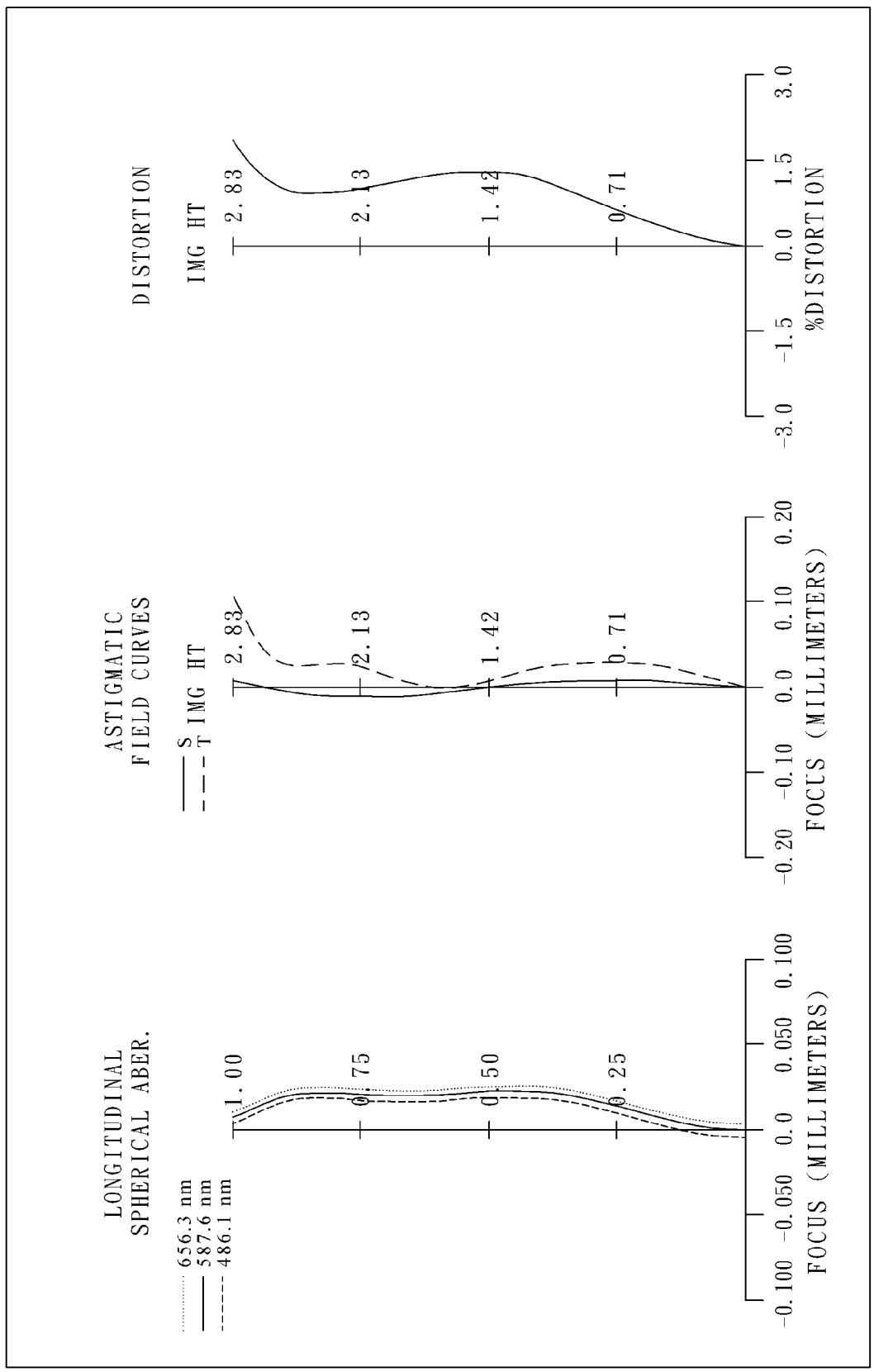
FIG. 1B shows spherical aberration curves, astigmatic field curves and a distortion curve of the optical photographing lens system according to the 1st embodiment.

FIG. 1A is a schematic view of an optical photographing lens system according to the 1st embodiment of the present disclosure. FIG. 1B shows spherical aberration curves, astigmatic field curves and a distortion curve of the optical photographing lens system according to the 1st embodiment. In FIG. 1A, the optical photographing lens system includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image plane 180.

The first lens element 110 made of plastic material has negative refractive power. The first lens element 110 has a convex object-side surface 111 and a concave image-side surface 112, and both the object-side surface 111 and the image-side surface 112 thereof are aspheric.

The second lens element 120 made of plastic material has positive refractive power. The second lens element 120 has a convex object-side surface 121 and a concave image-side surface 122; both the object-side surface 121 and the image-side surface 122 thereof are aspheric. Furthermore, the object-side surface 121 and the image-side surface 122 of the second lens element 120 both have at least one inflection point.

The third lens element 130 made of plastic material has positive refractive power. The third lens element 130 has a convex object-side surface 131 and a convex image-side surface 132. Both the object-side surface 131 and the image-side surface 132 of the third lens element 130 are aspheric.

The fourth lens element 140 made of plastic material has negative refractive power. The fourth lens element 140 has a concave object-side surface 141 and a convex image-side surface 142, and both the object-side surface 141 and the image-side surface 142 thereof are aspheric.

The fifth lens element 150 made of plastic material has positive refractive power. The fifth lens element 150 has a convex object-side surface 151 and a convex image-side surface 152, and both the object-side surface 151 and the image-side surface 152 thereof are aspheric.

The sixth lens element 160 made of plastic material has negative refractive power. The sixth lens element 160 has a convex object-side surface 161, and has a concave image-side surface 162 changing from concave at a paraxial region to convex at a peripheral region. Both the object-side surface 161 and the image-side surface 162 of the sixth lens element 160 are aspheric. Furthermore, the negative refractive power of the sixth lens element 160 becomes weak from the paraxial region to the peripheral region.

The IR-cut filter 170 made of glass material is located between the sixth lens element 160 and the image plane 180, and will not affect a focal length of the optical photographing lens system.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the optical photographing lens system according to the 1st embodiment, when a focal length of the optical photographing lens system is f, an f-number of the optical photographing lens system is Fno, and half of a maximal field of view of the optical photographing lens system is HFOV, these parameters have the following values:

f=2.83 mm;
Fno=2.45; and
HFOV=44.4 degrees.

In the optical photographing lens system according to the 1st embodiment, when a curvature radius of an object-side surface 111 of the first lens element 110 is R1, a curvature radius of an image-side surface 112 of the first lens element 110 is R2, a curvature radius of an object-side surface 121 of the second lens element 120 is R3, a curvature radius of an image-side surface 122 of the second lens element 120 is R4, the following relationship is satisfied:

$|(R1-R2)/(R1+R2)|+|(R3-R4)/(R3+R4)|=0.24$.

In the optical photographing lens system according to the 1st embodiment, when a curvature radius of an image-side surface 132 of the third lens element 130 is R6, and a curvature radius of an object-side surface 141 of the fourth lens element 140 is R7, the following relationship is satisfied:

$|R7/R6|=0.17$.

In the optical photographing lens system according to the 1st embodiment, when a curvature radius of an object-side surface 141 of the fourth lens element 140 is R7, and a curvature radius of an image-side surface 142 of the fourth lens element 140 is R8, the following relationship is satisfied:

$|(R7-R8)/(R7+R8)|=0.37$.

In the optical photographing lens system according to the 1st embodiment, when a curvature radius of an object-side surface 151 of the fifth lens element 150 is R9, and a curvature radius of an image-side surface 152 of the fifth lens element 150 is R10, the following relationship is satisfied:

$|R10/R9|=0.29$.

In the optical photographing lens system according to the 1st embodiment, when a curvature radius of an image-side surface 162 of the sixth lens element 160 is R12, and the focal length of the optical photographing lens system is f, the following relationship is satisfied:

$R12/f=0.25$.

In the optical photographing lens system according to the 1st embodiment, when the focal length of the optical photographing lens system is f, and a composite focal length of the first lens element 110 and the second lens element 120 is f12, the following relationship is satisfied:

$f/f12=0.29$.

In the optical photographing lens system according to the 1st embodiment, when the focal length of the optical photographing lens system is f, and a focal length of the second lens element 120 is f2, the following relationship is satisfied:

$f/f2=0.38$.

In the optical photographing lens system according to the 1st embodiment, when the focal length of the second lens element 120 is f2, and a focal length of the third lens element 130 is f3, the following relationship is satisfied:

$|f3/f2|=0.42$.

In the optical photographing lens system according to the 1st embodiment, when a composite focal length of the first lens element 110, the second lens element 120 and the third lens element 130 is f123, and a composite focal length of the fourth lens element 140, the fifth lens element 150, and the sixth lens element 160 is f456, the following relationship is satisfied:

$f123/f456=-0.06$.

In the optical photographing lens system according to the 1st embodiment, when the focal length of the optical photographing lens system is f, and a focal length of the fifth lens element 150 is f5, and a focal length of the sixth lens element 160 is f6, the following relationship is satisfied:

$f/f5-f/f6=3.13$.

In the optical photographing lens system according to the 1st embodiment, when a total axial distance of the air intervals between every lens element with refractive power is ΣAT (ΣAT equals to the sum of T12, T23, T34, T45 and T56), and an axial distance between the object-side surface 111 of the first lens element 110 and the image-side surface 162 of the sixth lens element 160 is Td, the following relationship is satisfied:

$\Sigma AT/Td=0.160$.

The detailed optical data of the 1st embodiment are shown in Table 1, and the aspheric surface data are shown in Table 2 below.

TABLE 1

1st Embodiment
f = 2.83 mm, Fno = 2.45, HFOV = 44.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.035 | | | | |
| 2 | Lens 1 | 2.786 (ASP) | 0.298 | Plastic | 1.544 | 55.9 | −38.59 |
| 3 | | 2.367 (ASP) | 0.056 | | | | |
| 4 | Lens 2 | 1.356 (ASP) | 0.313 | Plastic | 1.544 | 55.9 | 7.48 |
| 5 | | 1.868 (ASP) | 0.138 | | | | |
| 6 | Lens 3 | 2.811 (ASP) | 0.566 | Plastic | 1.544 | 55.9 | 3.17 |
| 7 | | −4.141 (ASP) | 0.224 | | | | |
| 8 | Lens 4 | −0.722 (ASP) | 0.279 | Plastic | 1.634 | 23.8 | −2.41 |
| 9 | | −1.574 (ASP) | 0.040 | | | | |
| 10 | Lens 5 | 3.521 (ASP) | 0.681 | Plastic | 1.544 | 55.9 | 1.53 |
| 11 | | −1.017 (ASP) | 0.035 | | | | |
| 12 | Lens 6 | 2.093 (ASP) | 0.453 | Plastic | 1.535 | 56.3 | −2.20 |
| 13 | | 0.697 (ASP) | 0.700 | | | | |
| 14 | IR-cut filter | Plano | 0.300 | Glass | 1.517 | 64.2 | — |

TABLE 1-continued

1st Embodiment
f = 2.83 mm, Fno = 2.45, HFOV = 44.4 deg.

| Surface # | | Curvature Radius | Thickness | Material | Index | Abbe # | Focal length |
|---|---|---|---|---|---|---|---|
| 15 | | Plano | 0.351 | | | | |
| 16 | Image | Plano | — | | | | |

Note:
Reference wavelength (d-line) is 587.6 nm.

TABLE 2

Aspheric Coefficients

| | \ Surface # | | | | | |
|---|---|---|---|---|---|---|
| | 2 | 3 | 4 | 5 | 6 | 7 |
| k = | −6.6027E+00 | 0.0000E+00 | −7.2286E+00 | −4.3823E+00 | −2.1551E+00 | 2.1714E+00 |
| A4 = | −2.7278E−02 | −5.4362E−01 | −2.5632E−01 | −1.5591E−01 | −1.5091E−01 | −8.8559E−03 |
| A6 = | 1.4119E−01 | 8.8317E−01 | 6.5866E−01 | 2.5435E−01 | −1.7033E−02 | −1.7726E−01 |
| A8 = | −3.3789E−01 | −1.7012E+00 | −1.8268E+00 | −6.5986E−01 | −1.1738E−02 | 7.5250E−03 |
| A10 = | −2.0299E+00 | 1.4407E−01 | −5.2917E−01 | 4.5416E−01 | −1.0724E−01 | −1.1816E−02 |
| A12 = | 8.3990E+00 | 6.6949E−01 | 5.8302E+00 | −2.6226E−01 | 1.6542E−01 | 7.6299E−02 |
| A14 = | −1.0058E+01 | −3.4243E−01 | −7.9848E+00 | 4.8091E−03 | −3.3066E−02 | −1.7865E−02 |

| | Surface # | | | | | |
|---|---|---|---|---|---|---|
| | 8 | 9 | 10 | 11 | 12 | 13 |
| k = | −1.6969E+00 | −2.1549E+00 | −1.3940E+01 | −5.5587E+00 | −1.5497E+01 | −4.3247E+00 |
| A4 = | 4.6932E−01 | 1.8534E−01 | −1.5745E−01 | −3.4212E−02 | −1.2472E−01 | −8.6055E−02 |
| A6 = | −8.0602E−01 | −2.1652E−01 | 1.9911E−01 | 1.9661E−03 | 3.7232E−02 | 2.8202E−02 |
| A8 = | 1.0985E+00 | 3.3559E−01 | −1.0662E−01 | 1.0841E−01 | −6.3759E−03 | −7.1746E−03 |
| A10 = | −9.9476E−01 | −2.6455E−01 | 1.4964E−02 | −8.6165E−02 | 5.6730E−04 | 1.1297E−03 |
| A12 = | 5.7139E−01 | 9.9179E−02 | 6.2629E−03 | 2.5445E−02 | 1.6531E−04 | −1.1439E−04 |
| A14 = | −1.7100E−01 | −1.4580E−02 | −2.3608E−03 | −2.6921E−03 | −3.5621E−05 | 5.5953E−06 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

2nd Embodiment

Figure 2A:
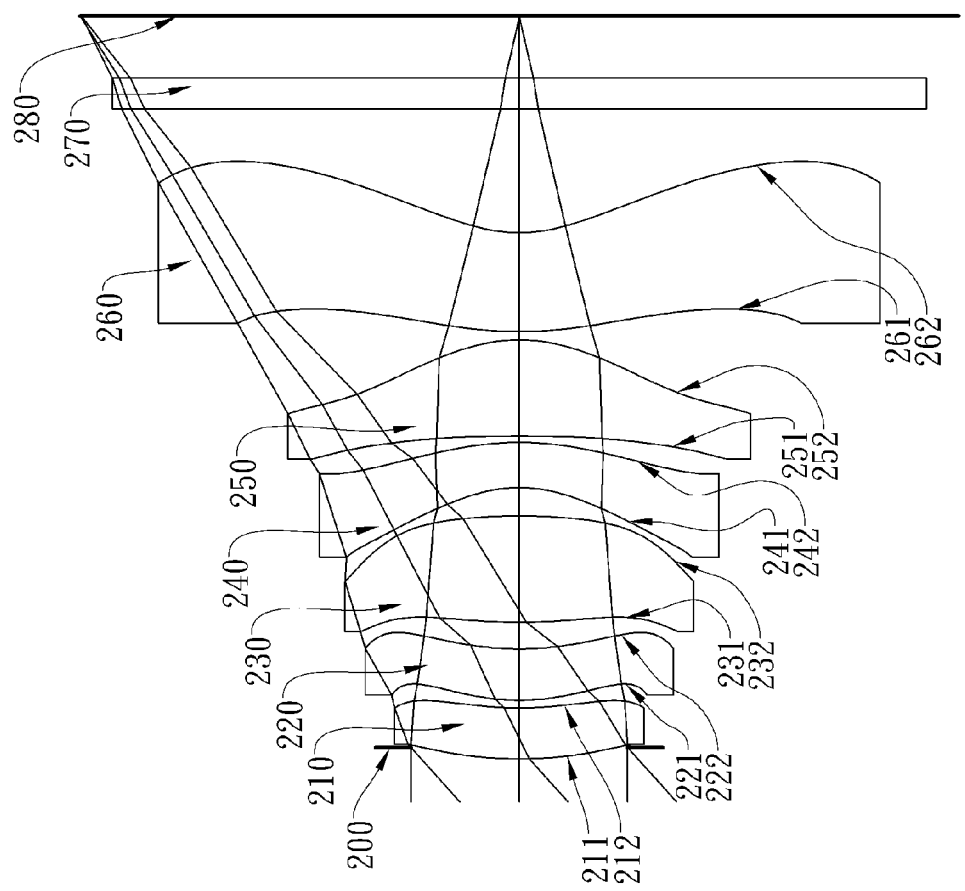
FIG. 2A is a schematic view of an optical photographing lens system according to the 2nd embodiment of the present disclosure.
Figure 2B:
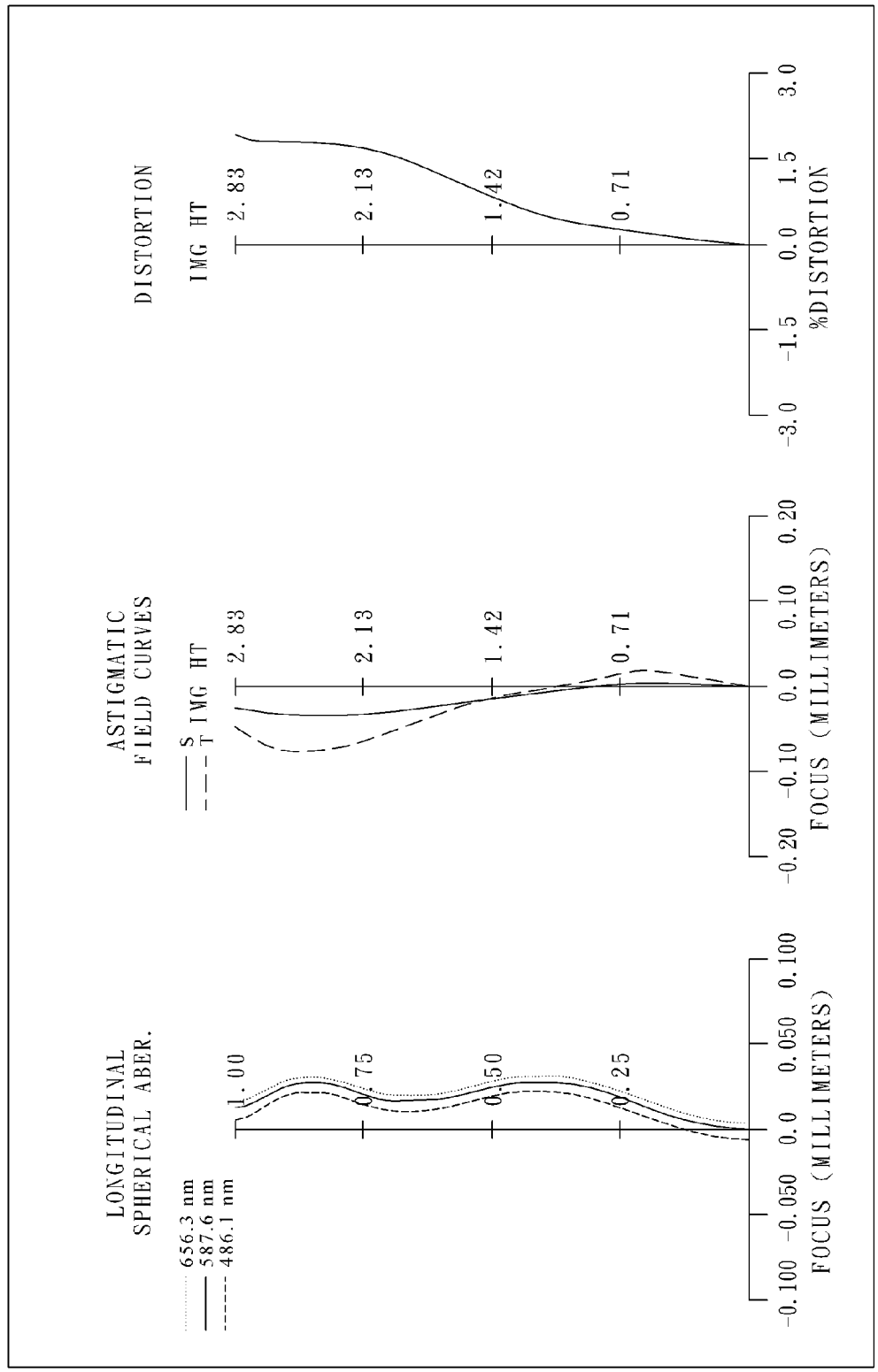
FIG. 2B shows spherical aberration curves, astigmatic field curves and a distortion curve of the optical photographing lens system according to the 2nd embodiment.

FIG. 2A is a schematic view of an optical photographing lens system according to the 2nd embodiment of the present disclosure. FIG. 2B shows spherical aberration curves, astigmatic field curves and a distortion curve of the optical photographing lens system according to the 2nd embodiment. In FIG. 2A, the optical photographing lens system includes, in order from an object side to an image side, an aperture stop 200, a first lens element 210, a second lens element 220, a third lens element 230, a fourth lens element 240, a fifth lens element 250, a sixth lens element 260, an IR-cut filter 270 and an image plane 280.

The first lens element 210 made of plastic material has negative refractive power. The first lens element 210 has a convex object-side surface 211 and a concave image-side surface 212, and both the object-side surface 211 and the image-side surface 212 thereof are aspheric.

The second lens element 220 made of plastic material has positive refractive power. The second lens element 220 has a convex object-side surface 221 and a concave image-side surface 222; both the object-side surface 221 and the image-side surface 222 thereof are aspheric. Furthermore, the object-side surface 221 and the image-side surface 222 of the second lens element 220 both have at least one inflection point.

The third lens element 230 made of plastic material has positive refractive power. The third lens element 230 has a convex object-side surface 231 and a convex image-side surface 232. Both the object-side surface 231 and the image-side surface 232 of the third lens element 230 are aspheric.

The fourth lens element 240 made of plastic material has negative refractive power. The fourth lens element 240 has a concave object-side surface 241 and a convex image-side surface 242, and both the object-side surface 241 and the image-side surface 242 thereof are aspheric.

The fifth lens element 250 made of plastic material has positive refractive power. The fifth lens element 250 has a concave object-side surface 251 and a convex image-side surface 252, and both the object-side surface 251 and the image-side surface 252 thereof are aspheric.

The sixth lens element 260 made of plastic material has negative refractive power. The sixth lens element 260 has a convex object-side surface 261, and has a concave image-side surface 262 changing from concave at a paraxial region to convex at a peripheral region. Both the object-side surface 261 and the image-side surface 262 of the sixth lens element 260 are aspheric. Furthermore, the negative refractive power of the sixth lens element 260 becomes weak from the paraxial region to the peripheral region.

The IR-cut filter 270 made of glass material is located between the sixth lens element 260 and the image plane 280, and will not affect a focal length of the optical photographing lens system.

The detailed optical data of the 2nd embodiment are shown in Table 3, and the aspheric surface data are shown in Table 4 below.

and Table 4 as the following values and satisfy the following relationships:

| | | | |
|---|---|---|---|
| f (mm) | 3.08 | R12/f | 0.29 |
| Fno | 2.20 | f/f12 | 0.31 |
| HFOV (deg.) | 42.0 | f/f2 | 0.48 |
| $|(R1 - R2)/(R1 + R2)| +$ | 0.29 | $|f3/f2|$ | 0.53 |
| $|(R3 - R4)/(R3 + R4)|$ | | | |
| $|R7/R6|$ | 0.23 | f123/f456 | −0.06 |

TABLE 3

2nd Embodiment
f = 3.08 mm, Fno = 2.20, HFOV = 42.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.073 | | | | |
| 2 | Lens 1 | 2.530 | (ASP) | 0.329 | Plastic | 1.535 | 56.3 | −21.86 |
| 3 | | 1.985 | (ASP) | 0.049 | | | | |
| 4 | Lens 2 | 1.269 | (ASP) | 0.332 | Plastic | 1.544 | 55.9 | 6.45 |
| 5 | | 1.805 | (ASP) | 0.172 | | | | |
| 6 | Lens 3 | 3.263 | (ASP) | 0.688 | Plastic | 1.535 | 56.3 | 3.41 |
| 7 | | −3.818 | (ASP) | 0.183 | | | | |
| 8 | Lens 4 | −0.870 | (ASP) | 0.292 | Plastic | 1.640 | 23.3 | −2.85 |
| 9 | | −1.883 | (ASP) | 0.040 | | | | |
| 10 | Lens 5 | −19.516 | (ASP) | 0.622 | Plastic | 1.544 | 55.9 | 1.99 |
| 11 | | −1.039 | (ASP) | 0.053 | | | | |
| 12 | Lens 6 | 2.322 | (ASP) | 0.639 | Plastic | 1.535 | 56.3 | −3.26 |
| 13 | | 0.900 | (ASP) | 0.800 | | | | |
| 14 | IR-cut filter | Plano | | 0.200 | Glass | 1.517 | 64.2 | — |
| 15 | | Plano | | 0.402 | | | | |
| 16 | Image | Plano | | — | | | | |

Note:
Reference wavelength (d-line) is 587.6 nm.

TABLE 4

Aspheric Coefficients

| | Surface # | | | | |
|---|---|---|---|---|---|
| 2 | 3 | 4 | 5 | 6 | 7 |
| k = −3.4213E+00 | 1.0683E+00 | −5.0103E+00 | −2.3233E+00 | −2.1551E+00 | −2.0682E−01 |
| A4 = −1.4414E−02 | −5.2197E−01 | −2.7619E−01 | −1.5591E−01 | −1.5091E−01 | −4.5708E−04 |
| A6 = 1.2009E−01 | 9.3795E−01 | 7.9882E−01 | 2.9858E−01 | −1.6846E−02 | −2.0845E−01 |
| A8 = 1.9069E−02 | −1.5420E+00 | −1.3619E+00 | −6.2826E−01 | −5.5774E−02 | 7.9487E−03 |
| A10 = −1.6586E+00 | 2.0007E−01 | −9.5462E−01 | 4.0466E−01 | −1.1381E−01 | −8.9672E−04 |
| A12 = 3.7166E+00 | 6.6949E−01 | 3.6890E+00 | −2.2197E−01 | 1.8300E−01 | 7.1524E−02 |
| A14 = −2.7522E+00 | −3.4243E−01 | −3.3569E+00 | 4.4876E−02 | −4.3849E−02 | −2.7474E−02 |

| | Surface # | | | | |
|---|---|---|---|---|---|
| 8 | 9 | 10 | 11 | 12 | 13 |
| k = −1.2356E+00 | −8.8869E−01 | 3.0000E+00 | −3.4833E+00 | −6.9812E+00 | −4.6026E+00 |
| A4 = 4.4858E−01 | 1.5728E−01 | −1.3751E−01 | −3.7022E−02 | −7.1191E−02 | −5.3459E−02 |
| A6 = −7.9920E−01 | −2.2894E−01 | 1.8471E−01 | 6.0129E−04 | 2.7165E−02 | 1.9953E−02 |
| A8 = 1.0931E+00 | 3.3781E−01 | −1.1275E−01 | 1.0919E−02 | −7.9419E−03 | −6.0165E−03 |
| A10 = −9.9829E−01 | −2.6094E−01 | 1.5832E−02 | −8.6170E−02 | 8.1333E−04 | 1.0773E−03 |
| A12 = 5.7899E−01 | 1.0049E−01 | 7.8688E−03 | 2.5294E−02 | 1.8724E−04 | −1.0674E−04 |
| A14 = −1.6044E−01 | −1.5035E−02 | −1.8982E−03 | −2.7051E−03 | −5.0425E−05 | 4.1649E−06 |

In the optical photographing lens system according to the 2nd embodiment, the definitions of f, f2, f3, f5, f6, f12, f123, f456, Fno, HFOV, R1, R2, R3, R4, R6, R7, R8, R9, R10, R12, ΣAT and Td are the same as those stated in the 1st embodiment with corresponding values for the 2nd embodiment. Moreover, these parameters can be calculated from Table 3

-continued

| | | | |
|---|---|---|---|
| $|(R7 - R8)/(R7 + R8)|$ | 0.37 | f/f5 − f/f6 | 2.49 |
| $|R10/R9|$ | 0.05 | ΣAT/Td | 0.146 |

3rd Embodiment

Figure 3A:
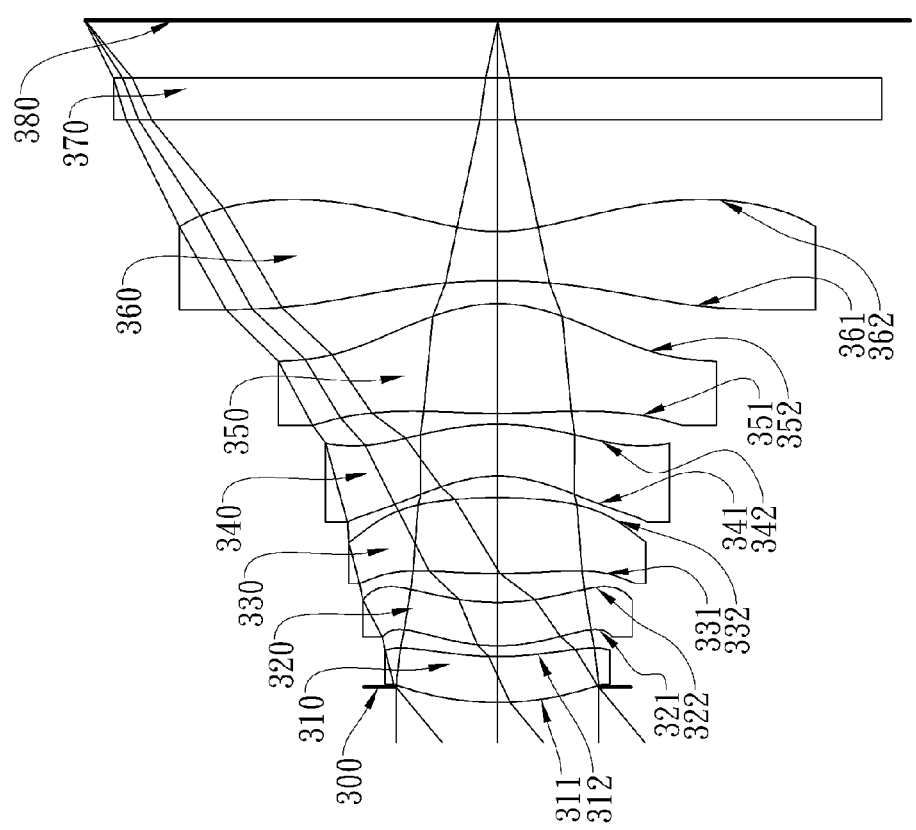
FIG. 3A is a schematic view of an optical photographing lens system according to the 3rd embodiment of the present disclosure.
Figure 3B:
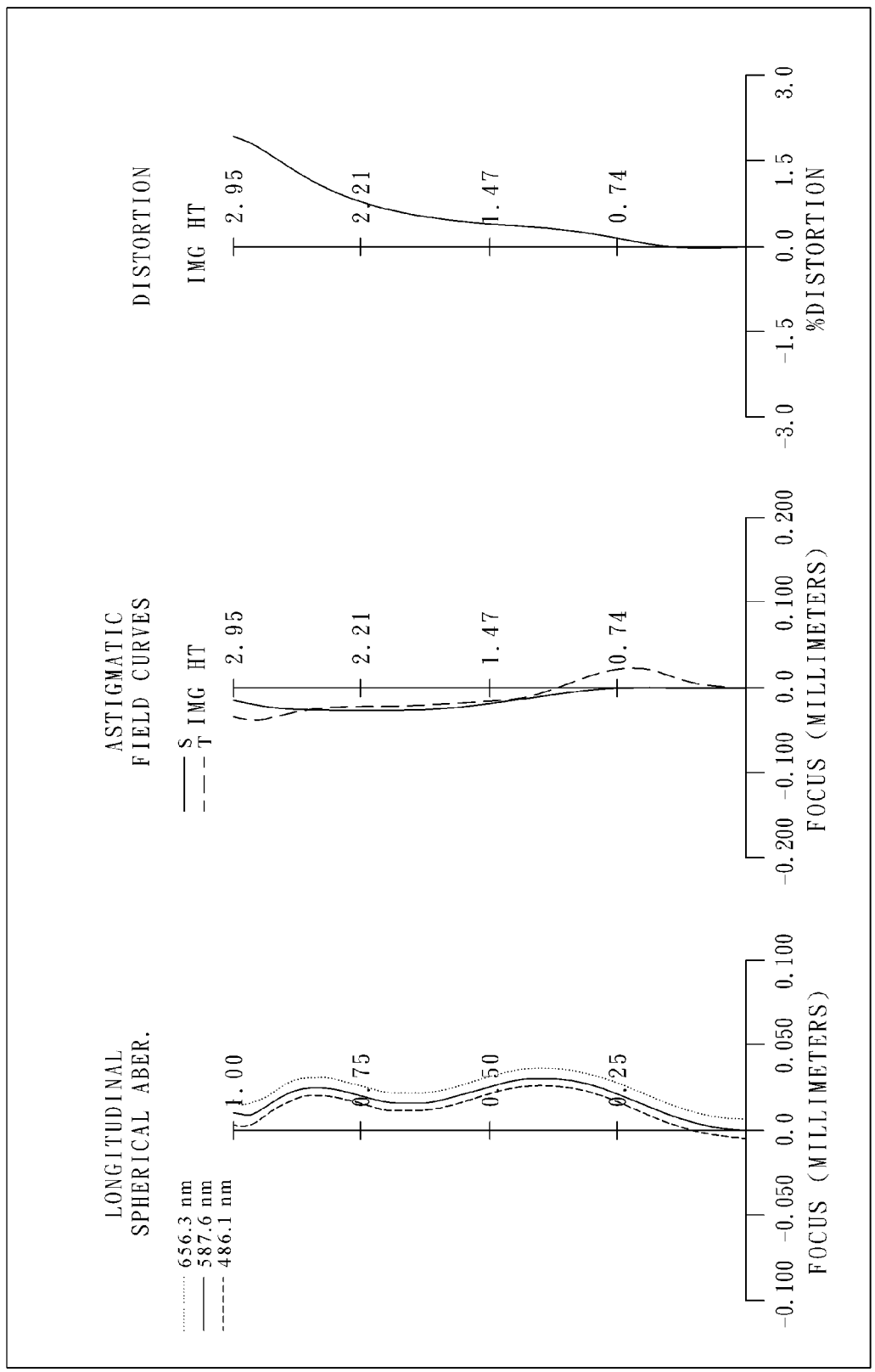
FIG. 3B shows spherical aberration curves, astigmatic field curves and a distortion curve of the optical photographing lens system according to the 3rd embodiment.

FIG. 3A is a schematic view of an optical photographing lens system according to the 3rd embodiment of the present disclosure. FIG. 3B shows spherical aberration curves, astigmatic field curves and a distortion curve of the optical photographing lens system according to the 3rd embodiment. In FIG. 3A, the optical photographing lens system includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image plane 380.

The first lens element 310 made of plastic material has negative refractive power. The first lens element 310 has a convex object-side surface 311 and a concave image-side surface 312, and both the object-side surface 311 and the image-side surface 312 thereof are aspheric.

The second lens element 320 made of plastic material has positive refractive power. The second lens element 320 has a convex object-side surface 321 and a concave image-side surface 322; both the object-side surface 321 and the image-side surface 322 thereof are aspheric. Furthermore, the object-side surface 321 and the image-side surface 322 of the second lens element 320 both have at least one inflection point.

The third lens element 330 made of plastic material has positive refractive power. The third lens element 330 has a convex object-side surface 331 and a convex image-side surface 332. Both the object-side surface 331 and the image-side surface 332 of the third lens element 330 are aspheric.

The fourth lens element 340 made of plastic material has negative refractive power. The fourth lens element 340 has a concave object-side surface 341 and a convex image-side surface 342, and both the object-side surface 341 and the image-side surface 342 thereof are aspheric.

The fifth lens element 350 made of plastic material has positive refractive power. The fifth lens element 350 has a convex object-side surface 351 and a convex image-side surface 352, and both the object-side surface 351 and the image-side surface 352 thereof are aspheric.

The sixth lens element 360 made of plastic material has negative refractive power. The sixth lens element 360 has a concave object-side surface 361, and has a concave image-side surface 362 changing from concave at a paraxial region to convex at a peripheral region. Both the object-side surface 361 and the image-side surface 362 of the sixth lens element 360 are aspheric. Furthermore, the negative refractive power of the sixth lens element 360 becomes weak from the paraxial region to the peripheral region.

The IR-cut filter 370 made of glass material is located between the sixth lens element 360 and the image plane 380, and will not affect a focal length of the optical photographing lens system.

The detailed optical data of the 3rd embodiment are shown in Table 5, and the aspheric surface data are shown in Table 6 below.

TABLE 5

3rd Embodiment
f = 3.48 mm, Fno = 2.40, HFOV = 39.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.110 | | | | |
| 2 | Lens 1 | 2.132 | (ASP) | 0.328 | Plastic | 1.570 | 57.5 | −98.89 |
| 3 | | 1.940 | (ASP) | 0.077 | | | | |
| 4 | Lens 2 | 1.182 | (ASP) | 0.312 | Plastic | 1.570 | 57.5 | 6.06 |
| 5 | | 1.625 | (ASP) | 0.207 | | | | |
| 6 | Lens 3 | 4.486 | (ASP) | 0.544 | Plastic | 1.544 | 55.9 | 3.80 |
| 7 | | −3.669 | (ASP) | 0.156 | | | | |
| 8 | Lens 4 | −0.908 | (ASP) | 0.371 | Plastic | 1.650 | 21.4 | −3.76 |
| 9 | | −1.677 | (ASP) | 0.076 | | | | |
| 10 | Lens 5 | 4.921 | (ASP) | 0.788 | Plastic | 1.544 | 55.9 | 1.66 |
| 11 | | −1.042 | (ASP) | 0.164 | | | | |
| 12 | Lens 6 | −4.213 | (ASP) | 0.352 | Plastic | 1.544 | 55.9 | −1.71 |
| 13 | | 1.229 | (ASP) | 0.800 | | | | |
| 14 | IR-cut filter | Plano | | 0.300 | Glass | 1.517 | 64.2 | — |
| 15 | | Plano | | 0.414 | | | | |
| 16 | Image | Plano | | — | | | | |

Note:
Reference wavelength (d-line) is 587.6 nm.

TABLE 6

Aspheric Coefficients

| | Surface # | | | | | |
|---|---|---|---|---|---|---|
| | 2 | 3 | 4 | 5 | 6 | 7 |
| k = | −4.2343E−01 | −1.7761E+01 | −6.0404E+00 | −2.9197E+00 | −2.1551E+00 | 2.4569E+00 |
| A4 = | −4.4917E−02 | −2.3813E−01 | −1.9450E−01 | −1.3452E−01 | −1.3020E−01 | −1.5530E−02 |
| A6 = | 2.0406E−01 | 7.4364E−01 | 6.0458E−01 | 1.9684E−01 | −5.3444E−02 | −1.6069E−01 |
| A8 = | −9.6045E−02 | −1.1701E+00 | −1.1631E+00 | −4.6227E−01 | −4.6658E−02 | 8.9064E−03 |
| A10 = | −9.0360E−01 | 1.5988E−01 | −5.2640E−01 | 2.4408E−01 | −7.6409E−02 | −2.4298E−03 |

TABLE 6-continued

Aspheric Coefficients

| | | | | | |
|---|---|---|---|---|---|
| A12 = | 1.8400E+00 | 3.8972E−01 | 2.9520E+00 | −2.0902E−01 | 1.3139E−01 | 4.4767E−02 |
| A14 = | −1.1799E+00 | −1.8065E−01 | −3.0670E+00 | 6.3386E−02 | −9.8318E−03 | −1.3558E−03 |

| | Surface # | | | | | |
|---|---|---|---|---|---|---|
| | 8 | 9 | 10 | 11 | 12 | 13 |
| k = | −1.6157E+00 | −2.3085E+00 | −9.8310E+00 | −4.6649E+00 | −3.0000E+01 | −9.0658E+00 |
| A4 = | 4.1773E−01 | 1.6131E−01 | −1.9951E−01 | −3.8207E−02 | −4.0856E−02 | −5.8294E−02 |
| A6 = | −6.1878E−01 | −1.7089E−01 | 1.6315E−01 | 3.9839E−03 | 2.6904E−02 | 1.9113E−02 |
| A8 = | 7.8172E−01 | 2.4154E−01 | −7.6948E−02 | 7.6944E−02 | −5.1778E−03 | −4.9499E−03 |
| A10 = | −6.3871E−01 | −1.6706E−01 | 7.6165E−03 | −5.5566E−03 | 2.0291E−04 | 7.5252E−04 |
| A12 = | 3.3353E−01 | 5.8113E−02 | 3.9238E−03 | 1.4880E−02 | 2.91184E−05 | −4.9483E−05 |
| A14 = | −9.7968E−02 | −8.8904E−03 | −3.8076E−04 | −1.4083E−03 | −1.9508E−06 | −6.9932E−08 |

In the optical photographing lens system according to the 3rd embodiment, the definitions off, f2, f3, f5, f6, f12, f123, f456, Fno, HFOV, R1, R2, R3, R4, R6, R7, R8, R9, R10, R12, ΣAT and Td are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f [mm] | 3.48 | R12/f | 0.35 |
| Fno | 2.40 | f/f12 | 0.51 |
| HFOV [deg.] | 39.6 | f/f2 | 0.57 |
| \|(R1 − R2)/(R1 + R2)\| + \|(R3 − R4)/(R3 + R4)\| | 0.20 | \|f3/f2\| | 0.63 |
| \|R7/R6\| | 0.25 | f123/f456 | −0.31 |
| \|(R7 − R8)/(R7 + R8)\| | 0.30 | f/f5 − f/f6 | 4.14 |
| \|R10/R9\| | 0.21 | ΣAT/Td | 0.201 |

4th Embodiment

Figure 4A:
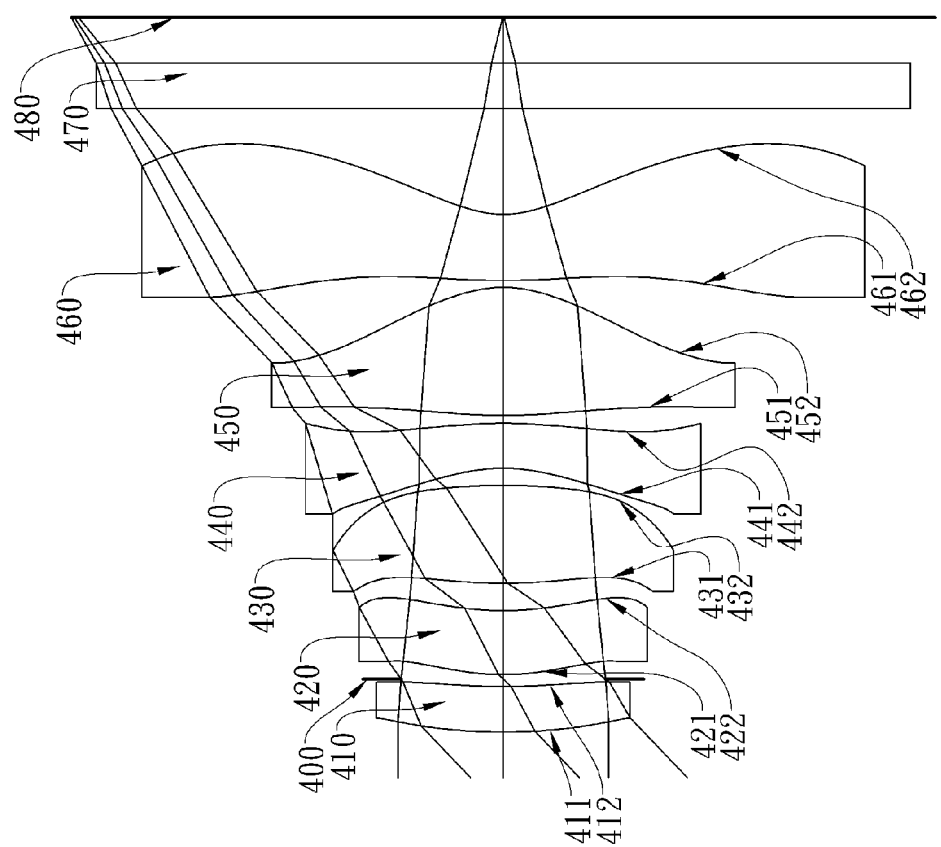
FIG. 4A is a schematic view of an optical photographing lens system according to the 4th embodiment of the present disclosure.
Figure 4B:
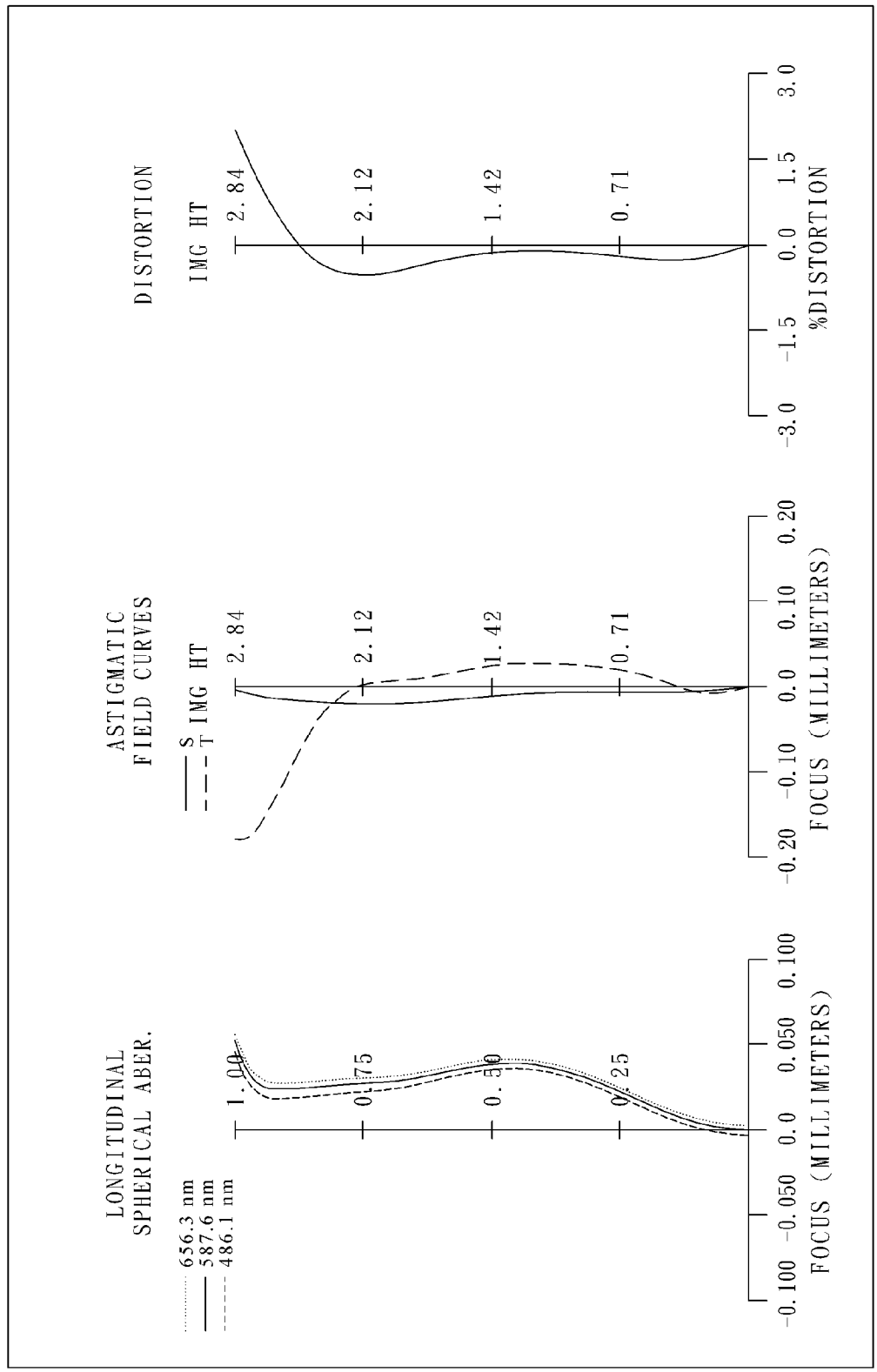
FIG. 4B shows spherical aberration curves, astigmatic field curves and a distortion curve of the optical photographing lens system according to the 4th embodiment.

FIG. 4A is a schematic view of an optical photographing lens system according to the 4th embodiment of the present disclosure. FIG. 4B shows spherical aberration curves, astigmatic field curves and a distortion curve of the optical photographing lens system according to the 4th embodiment. In FIG. 4A, the optical photographing lens system includes, in order from an object side to an image side, a first lens element 410, an aperture stop 400, a second lens element 420, a third lens element 430, a fourth lens element 440, a fifth lens element 450, a sixth lens element 460, an IR-cut filter 470 and an image plane 480.

The first lens element 410 made of plastic material has negative refractive power. The first lens element 410 has a convex object-side surface 411 and a concave image-side surface 412, and both the object-side surface 411 and the image-side surface 412 thereof are aspheric.

The second lens element 420 made of plastic material has positive refractive power. The second lens element 420 has a convex object-side surface 421 and a concave image-side surface 422; both the object-side surface 421 and the image-side surface 422 thereof are aspheric. Furthermore, the object-side surface 421 and the image-side surface 422 of the second lens element 420 both have at least one inflection point.

The third lens element 430 made of plastic material has positive refractive power. The third lens element 430 has a convex object-side surface 431 and a convex image-side surface 432. Both the object-side surface 431 and the image-side surface 432 of the third lens element 430 are aspheric.

The fourth lens element 440 made of plastic material has negative refractive power. The fourth lens element 440 has a concave object-side surface 441 and a convex image-side surface 442, and both the object-side surface 441 and the image-side surface 442 thereof are aspheric.

The fifth lens element 450 made of plastic material has positive refractive power. The fifth lens element 450 has a convex object-side surface 451 and a convex image-side surface 452, and both the object-side surface 451 and the image-side surface 452 thereof are aspheric.

The sixth lens element 460 made of plastic material has negative refractive power. The sixth lens element 460 has a convex object-side surface 461, and has a concave image-side surface 462 changing from concave at a paraxial region to convex at a peripheral region. Both the object-side surface 461 and the image-side surface 462 of the sixth lens element 460 are aspheric. Furthermore, the negative refractive power of the sixth lens element 460 becomes weak from the paraxial region to the peripheral region.

The IR-cut filter 470 made of glass material is located between the sixth lens element 460 and the image plane 480, and will not affect a focal length of the optical photographing lens system.

The detailed optical data of the 4th embodiment are shown in Table 7, and the aspheric surface data are shown in Table 8 below.

TABLE 7

4th Embodiment
f = 2.88 mm, Fno = 2.07, HFOV = 43.8 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 3.503 | (ASP) | 0.300 | Plastic | 1.544 | 55.9 | −52.62 |
| 2 | | 3.027 | (ASP) | 0.050 | | | | |
| 3 | Ape. Stop | Plano | | 0.030 | | | | |

TABLE 7-continued

4th Embodiment
f = 2.88 mm, Fno = 2.07, HFOV = 43.8 deg.

| Surface # | | Curvature Radius | | Thickness | Material | Index | Abbe # | Focal length |
|---|---|---|---|---|---|---|---|---|
| 4 | Lens 2 | 1.451 | (ASP) | 0.423 | Plastic | 1.544 | 55.9 | 8.73 |
| 5 | | 1.874 | (ASP) | 0.181 | | | | |
| 6 | Lens 3 | 3.092 | (ASP) | 0.647 | Plastic | 1.544 | 55.9 | 3.49 |
| 7 | | −4.562 | (ASP) | 0.114 | | | | |
| 8 | Lens 4 | −1.139 | (ASP) | 0.297 | Plastic | 1.640 | 23.3 | −2.80 |
| 9 | | −3.448 | (ASP) | 0.053 | | | | |
| 10 | Lens 5 | 3.294 | (ASP) | 0.847 | Plastic | 1.544 | 55.9 | 1.26 |
| 11 | | −0.789 | (ASP) | 0.045 | | | | |
| 12 | Lens 6 | 4.479 | (ASP) | 0.438 | Plastic | 1.544 | 55.9 | −1.43 |
| 13 | | 0.641 | (ASP) | 0.700 | | | | |
| 14 | IR-cut filter | Plano | | 0.300 | Glass | 1.517 | 64.2 | — |
| 15 | | Plano | | 0.300 | | | | |
| 16 | Image | Plano | | — | | | | |

Note:
Reference wavelength (d-line) is 587.6 nm.

TABLE 8

Aspheric Coefficients

| | Surface # | | | | | |
|---|---|---|---|---|---|---|
| | 1 | 2 | 4 | 5 | 6 | 7 |
| k = | −1.0000E+00 | 0.0000E+00 | −9.1849E+00 | −5.5730E+00 | −2.1551E+00 | −1.0379E+00 |
| A4 = | −4.8566E−02 | −5.0425E−01 | −2.6385E−01 | −1.5591E−01 | −1.5091E−01 | −7.3607E−03 |
| A6 = | 6.1468E−02 | 1.3496E+00 | 9.0015E−01 | 2.3442E−01 | 2.2460E−02 | −1.6557E−01 |
| A8 = | 8.9899E−01 | −1.9909E+00 | −1.5989E+00 | −5.4893E−01 | −5.3929E−02 | −1.0216E−02 |
| A10 = | −3.4143E+00 | 6.3910E−01 | −1.0901E+00 | 5.6090E−01 | −1.6749E−01 | −9.2205E−03 |
| A12 = | 4.5956E+00 | 6.6949E−01 | 6.4187E+00 | −4.5417E−01 | 1.6600E−01 | 8.2787E−02 |
| A14 = | −2.2532E+00 | −3.4243E−01 | −6.2394E+00 | 1.1753E−01 | −3.5363E−02 | −4.3640E−02 |

| | Surface # | | | | | |
|---|---|---|---|---|---|---|
| | 8 | 9 | 10 | 11 | 12 | 13 |
| k = | −1.4291E+00 | 1.4928E+00 | −1.7928E+01 | −4.4893E+00 | −5.0000E+01 | −4.6155E+00 |
| A4 = | 4.6545E−01 | 1.5909E−01 | −1.6311E−01 | −5.4798E−02 | −9.3661E−02 | −7.0300E−02 |
| A6 = | −7.9975E−01 | −2.1981E−01 | 1.8828E−01 | −6.4161E−03 | 4.0192E−02 | 2.7016E−02 |
| A8 = | 1.0910E+00 | 3.3885E−01 | −1.0795E−01 | 1.1093E−01 | −8.3267E−03 | −7.4173E−03 |
| A10 = | −1.0110E+00 | −2.6152E−01 | 1.6687E−02 | −8.5048E−02 | 3.8568E−04 | 1.1647E−03 |
| A12 = | 5.6728E−01 | 9.9755E−02 | 7.0809E−03 | 2.5654E−02 | 1.7023E−04 | −9.6559E−05 |
| A14 = | −1.4695E−01 | −1.5421E−02 | −2.0493E−03 | −2.7694E−03 | −2.1587E−05 | 3.3022E−06 |

In the optical photographing lens system according to the 4th embodiment, the definitions off, f2, f3, f5, f6, f12, f123, f456, Fno, HFOV, R1, R2, R3, R4, R6, R7, R8, R9, R10, R12, ΣAT and Td are the same as those stated in the 1st embodiment with corresponding values for the 4th embodiment. Moreover, these parameters can be calculated from Table 7 and Table 8 as the following values and satisfy the following relationships:

| f [mm] | 2.88 | R12/f | 0.22 |
|---|---|---|---|
| Fno | 2.07 | f/f12 | 0.26 |
| HFOV [deg.] | 43.8 | f/f2 | 0.33 |
| |(R1 − R2)/(R1 + R2)| + |(R3 − R4)/(R3 + R4)| | 0.20 | |f3/f2| | 0.40 |
| |R7/R6| | 0.25 | f123/f456 | −0.01 |
| |(R7 − R8)/(R7 + R8)| | 0.50 | f/f5 − f/f6 | 4.29 |
| |R10/R9| | 0.24 | ΣAT/Td | 0.138 |

5th Embodiment

Figure 5A:
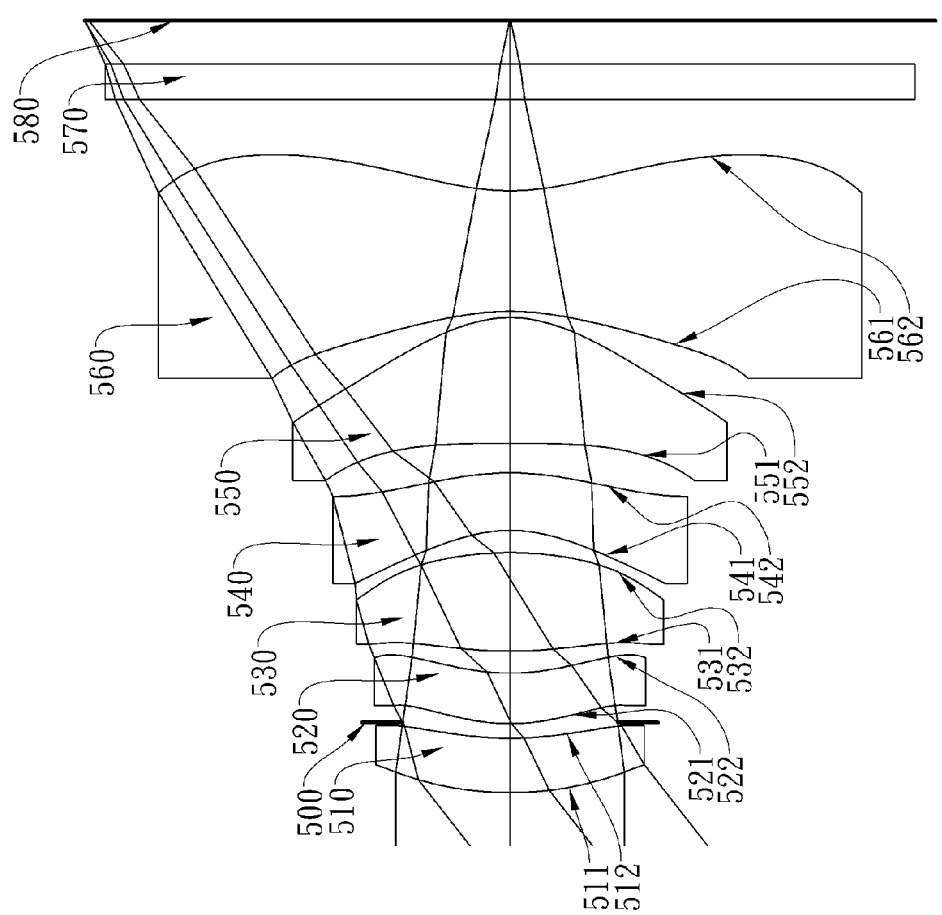
FIG. 5A is a schematic view of an optical photographing lens system according to the 5th embodiment of the present disclosure.
Figure 5B:
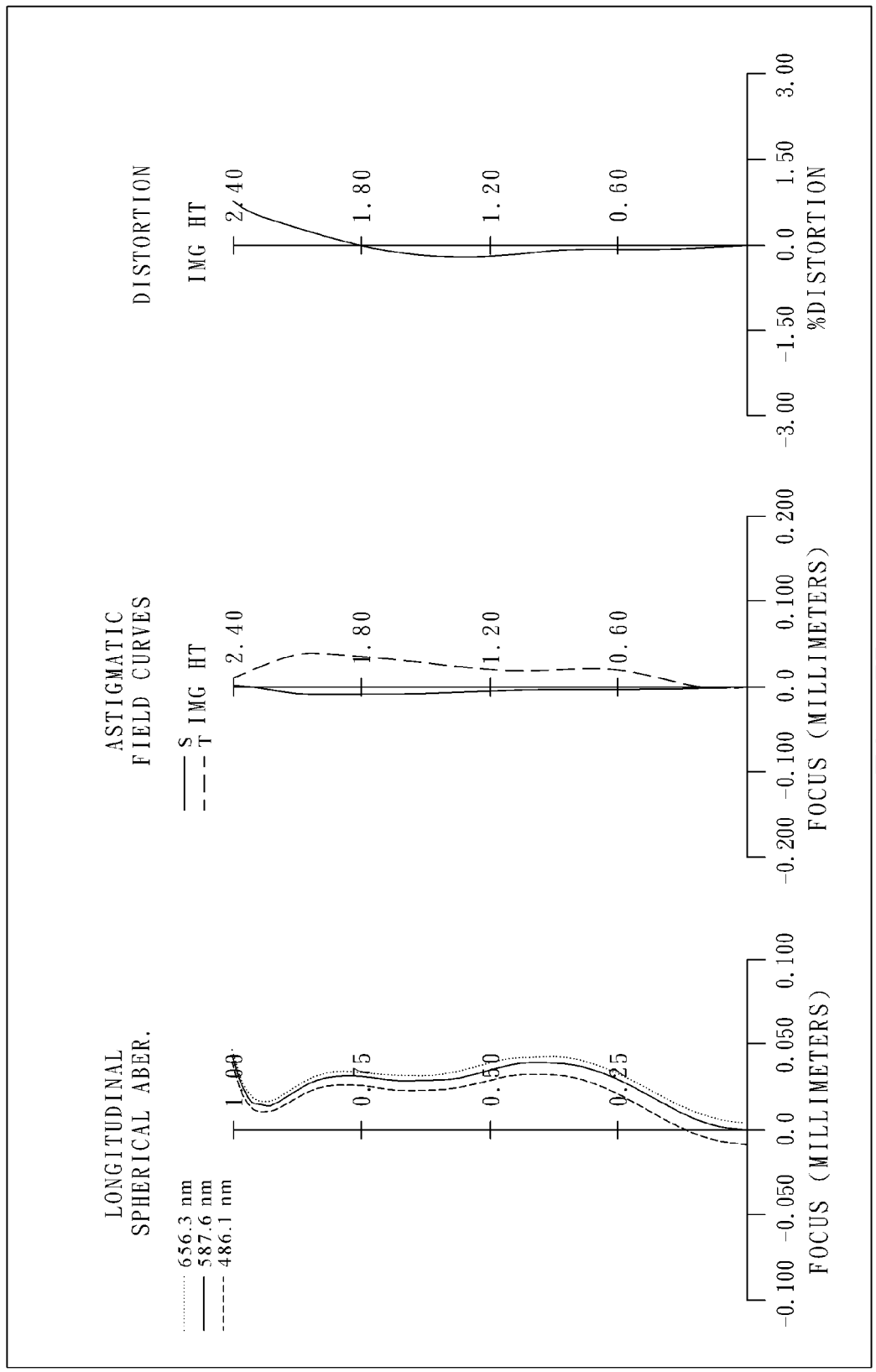
FIG. 5B shows spherical aberration curves, astigmatic field curves and a distortion curve of the optical photographing lens system according to the 5th embodiment.

FIG. 5A is a schematic view of an optical photographing lens system according to the 5th embodiment of the present disclosure. FIG. 5B shows spherical aberration curves, astigmatic field curves and a distortion curve of the optical photographing lens system according to the 5th embodiment. In FIG. 5A, the optical photographing lens system includes, in order from an object side to an image side, a first lens element 510, an aperture stop 500, a second lens element 520, a third lens element 530, a fourth lens element 540, a fifth lens element 550, a sixth lens element 560, an IR-cut filter 570 and an image plane 580.

The first lens element 510 made of plastic material has negative refractive power. The first lens element 510 has a convex object-side surface 511 and a concave image-side surface 512, and both the object-side surface 511 and the image-side surface 512 thereof are aspheric.

The second lens element 520 made of plastic material has positive refractive power. The second lens element 520 has a convex object-side surface 521 and a concave image-side surface 522; both the object-side surface 521 and the image-side surface 522 thereof are aspheric. Furthermore, the object-side surface 521 and the image-side surface 522 of the second lens element 520 both have at least one inflection point.

The third lens element 530 made of plastic material has positive refractive power. The third lens element 530 has a convex object-side surface 531 and a convex image-side surface 532. Both the object-side surface 531 and the image-side surface 532 of the third lens element 530 are aspheric.

The fourth lens element 540 made of plastic material has negative refractive power. The fourth lens element 540 has a concave object-side surface 541 and a convex image-side surface 542, and both the object-side surface 541 and the image-side surface 542 thereof are aspheric.

The fifth lens element 550 made of plastic material has positive refractive power. The fifth lens element 550 has a concave object-side surface 551 and a convex image-side surface 552, and both the object-side surface 551 and the image-side surface 552 thereof are aspheric.

The sixth lens element 560 made of plastic material has negative refractive power. The sixth lens element 560 has a concave object-side surface 561, and has a concave image-side surface 562 changing from concave at a paraxial region to convex at a peripheral region. Both the object-side surface 561 and the image-side surface 562 of the sixth lens element 560 are aspheric. Furthermore, the negative refractive power of the sixth lens element 560 becomes weak from the paraxial region to the peripheral region.

The IR-cut filter 570 made of glass material is located between the sixth lens element 560 and the image plane 580, and will not affect a focal length of the optical photographing lens system.

The detailed optical data of the 5th embodiment are shown in Table 9, and the aspheric surface data are shown in Table 10 below.

TABLE 9

5th Embodiment
f = 3.04 mm, Fno = 2.36, HFOV = 37.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.827 | (ASP) | 0.306 | Plastic | 1.585 | 60.2 | −58.41 |
| 2 | | 1.627 | (ASP) | 0.091 | | | | |
| 3 | Ape. Stop | Plano | | −0.008 | | | | |
| 4 | Lens 2 | 1.009 | (ASP) | 0.285 | Plastic | 1.544 | 55.9 | 7.65 |
| 5 | | 1.200 | (ASP) | 0.124 | | | | |
| 6 | Lens 3 | 2.331 | (ASP) | 0.556 | Plastic | 1.544 | 55.9 | 2.03 |
| 7 | | −1.927 | (ASP) | 0.125 | | | | |
| 8 | Lens 4 | −0.818 | (ASP) | 0.325 | Plastic | 1.640 | 23.3 | −3.34 |
| 9 | | −1.532 | (ASP) | 0.165 | | | | |
| 10 | Lens 5 | −100.000 | (ASP) | 0.711 | Plastic | 1.544 | 55.9 | 1.28 |
| 11 | | −0.692 | (ASP) | 0.035 | | | | |
| 12 | Lens 6 | −1.438 | (ASP) | 0.680 | Plastic | 1.585 | 60.2 | −1.05 |
| 13 | | 1.254 | (ASP) | 0.514 | | | | |
| 14 | IR-cut filter | Plano | | 0.200 | Glass | 1.517 | 64.2 | — |
| 15 | | Plano | | 0.246 | | | | |
| 16 | Image | Plano | | — | | | | |

Note:
Reference wave ength (d-line) is 587.6 nm.

TABLE 10

Aspheric Coefficients

| | Surface # | | | | | |
|---|---|---|---|---|---|---|
| | 1 | 2 | 4 | 5 | 6 | 7 |
| k = | −1.7440E−01 | −1.2936E+01 | −6.7519E+00 | −5.0129E+00 | −2.1551E+00 | −1.5639E+00 |
| A4 = | −6.2158E−02 | −3.7597E−01 | −3.0966E−01 | −2.1361E−01 | −2.0676E−01 | 5.3237E−03 |
| A6 = | 2.8439E−01 | 1.7233E+00 | 1.3013E+00 | 3.0886E−01 | 1.8109E−02 | −3.4528E−01 |
| A8 = | 1.2869E−01 | −3.3631E+00 | −3.4194E+00 | −9.5428E−01 | −1.3617E−01 | 8.2335E−02 |
| A10 = | −2.8798E+00 | 8.5363E+00 | −1.2213E+01 | 1.1113E+00 | −3.7572E−01 | 4.3945E−02 |
| A12 = | 6.1201E+00 | 2.1240E+00 | 1.6924E+01 | −2.1360E+00 | 7.3357E−01 | 2.3048E−01 |
| A14 = | −4.4668E+00 | −1.3402E+00 | −2.4425E+01 | 1.4138E+00 | −4.3708E−02 | −9.0158E−02 |

| | Surface # | | | | | |
|---|---|---|---|---|---|---|
| | 8 | 9 | 10 | 11 | 12 | 13 |
| k = | −1.2900E+00 | −4.0561E+00 | −3.8033E+00 | −3.2996E+00 | −1.1992E+01 | −9.6254E+00 |
| A4 = | 6.2228E−01 | 2.5011E−01 | −3.0161E−01 | −7.9789E−02 | −3.1058E−02 | −6.5556E−02 |
| A6 = | −1.3438E+00 | −4.0686E−01 | 2.8162E−01 | −1.7721E−02 | 4.2113E−02 | 2.5260E−02 |
| A8 = | 2.2969E+00 | 6.8267E−01 | −1.9705E−01 | 2.2600E−01 | −2.3969E−02 | −9.0337E−03 |
| A10 = | −2.6049E+00 | −6.7325E−01 | 3.2174E−02 | −2.2372E−01 | 1.2799E−03 | 2.0805E−03 |
| A12 = | 1.8166E+00 | 3.3052E−01 | 1.1505E−02 | 8.2432E−02 | 1.0673E−03 | −3.1568E−04 |
| A14 = | −6.2830E−01 | −5.6697E−02 | −1.9889E−03 | −1.0459E−02 | −6.1624E−04 | 2.0071E−05 |

In the optical photographing lens system according to the 5th embodiment, the definitions off, f2, f3, f5, f6, f12, f123, f456, Fno, HFOV, R1, R2, R3, R4, R6, R7, R8, R9, R10, R12, ΣAT and Td are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f [mm] | 3.04 | R12/f | 0.41 |
| Fno | 2.36 | f/f12 | 0.32 |
| HFOV [deg.] | 37.9 | f/f2 | 0.40 |
| \|(R1 − R2)/(R1 + R2)\| + \|(R3 − R4)/(R3 + R4)\| | 0.14 | \|f3/f2\| | 0.27 |
| \|R7/R6\| | 0.42 | f123/f456 | −0.71 |
| \|(R7 − R8)/(R7 + R8)\| | 0.30 | f/f5 − f/f6 | 5.28 |
| \|R10/R9\| | 0.01 | ΣAT/Td | 0.157 |

6th Embodiment

Figure 6A:
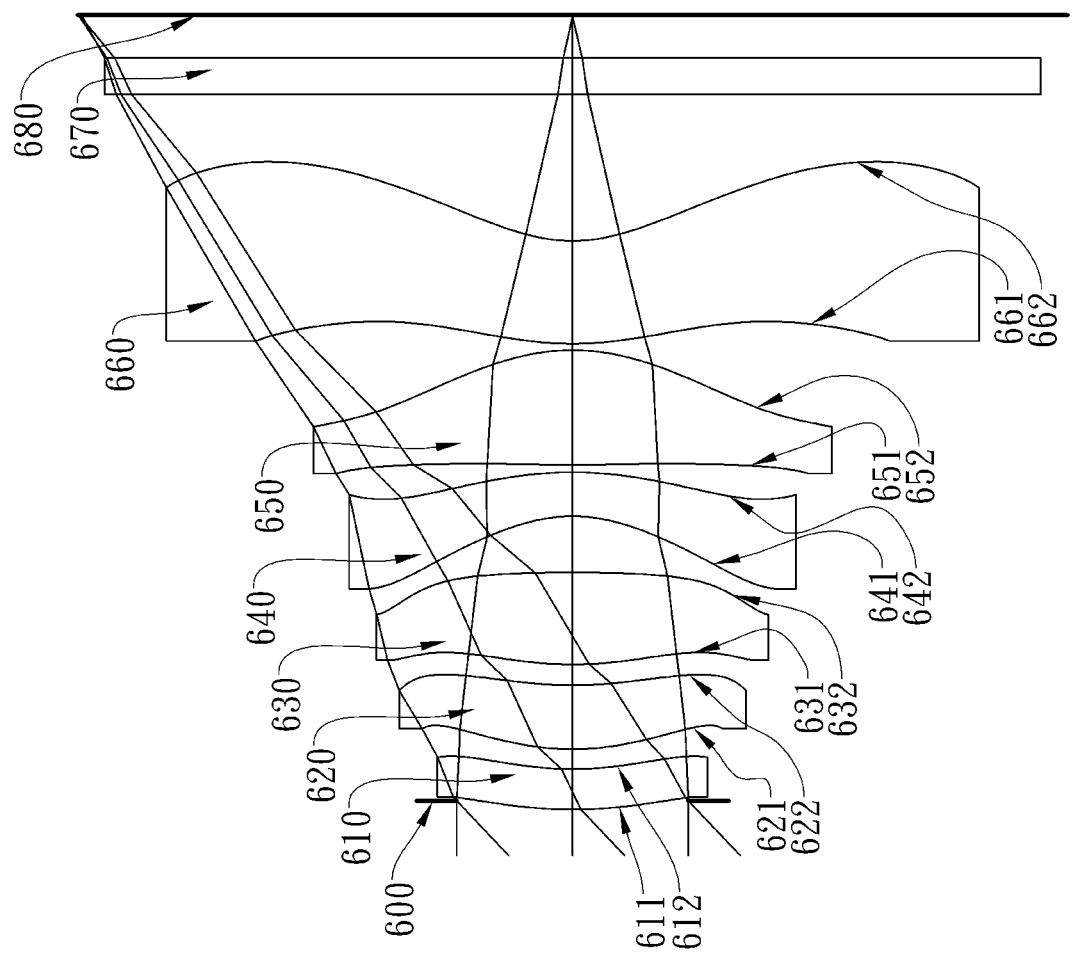
FIG. 6A is a schematic view of an optical photographing lens system according to the 6th embodiment of the present disclosure.
Figure 6B:
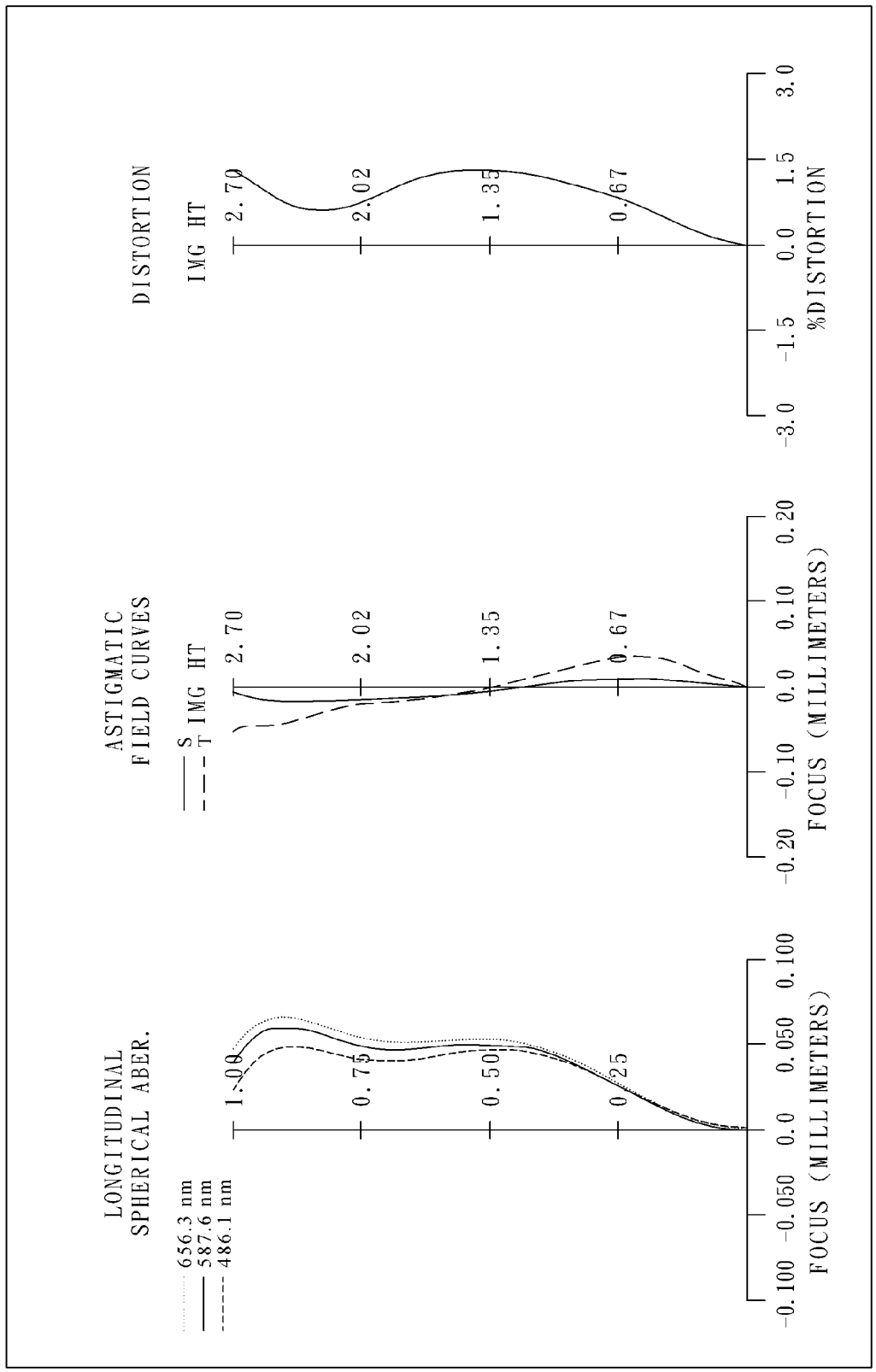
FIG. 6B shows spherical aberration curves, astigmatic field curves and a distortion curve of the optical photographing lens system according to the 6th embodiment.

FIG. 6A is a schematic view of an optical photographing lens system according to the 6th embodiment of the present disclosure. FIG. 6B shows spherical aberration curves, astigmatic field curves and a distortion curve of the optical photographing lens system according to the 6th embodiment. In FIG. 6A, the optical photographing lens system includes, in order from an object side to an image side, an aperture stop 600, a first lens element 610, a second lens element 620, a third lens element 630, a fourth lens element 640, a fifth lens element 650, a sixth lens element 660, an IR-cut filter 670 and an image plane 680.

The first lens element 610 made of plastic material has negative refractive power. The first lens element 610 has a convex object-side surface 611 and a concave image-side surface 612, and both the object-side surface 611 and the image-side surface 612 thereof are aspheric.

The second lens element 620 made of plastic material has positive refractive power. The second lens element 620 has a convex object-side surface 621 and a concave image-side surface 622; both the object-side surface 621 and the image-side surface 622 thereof are aspheric. Furthermore, the object-side surface 621 and the image-side surface 622 of the second lens element 620 both have at least one inflection point.

The third lens element 630 made of plastic material has positive refractive power. The third lens element 630 has a convex object-side surface 631 and a convex image-side surface 632. Both the object-side surface 631 and the image-side surface 632 of the third lens element 630 are aspheric.

The fourth lens element 640 made of plastic material has negative refractive power. The fourth lens element 640 has a concave object-side surface 641 and a convex image-side surface 642, and both the object-side surface 641 and the image-side surface 642 thereof are aspheric.

The fifth lens element 650 made of plastic material has positive refractive power. The fifth lens element 650 has a convex object-side surface 651 and a convex image-side surface 652, and both the object-side surface 651 and the image-side surface 652 thereof are aspheric.

The sixth lens element 660 made of plastic material has negative refractive power. The sixth lens element 660 has a convex object-side surface 661, and has a concave image-side surface 662 changing from concave at a paraxial region to convex at a peripheral region. Both the object-side surface 661 and the image-side surface 662 of the sixth lens element 660 are aspheric. Furthermore, the negative refractive power of the sixth lens element 660 becomes weak from the paraxial region to the peripheral region.

The IR-cut filter 670 made of glass material is located between the sixth lens element 660 and the image plane 680, and will not affect a focal length of the optical photographing lens system.

The detailed optical data of the 6th embodiment are shown in Table 11, and the aspheric surface data are shown in Table 12 below.

TABLE 11

6th Embodiment
f = 2.78 mm, Fno = 2.20, HFOV = 43.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.048 | | | | |
| 2 | Lens 1 | 2.189 | (ASP) | 0.221 | Plastic | 1.634 | 23.8 | −11.02 |
| 3 | | 1.602 | (ASP) | 0.109 | | | | |
| 4 | Lens 2 | 1.305 | (ASP) | 0.350 | Plastic | 1.530 | 55.8 | 6.20 |
| 5 | | 1.963 | (ASP) | 0.114 | | | | |
| 6 | Lens 3 | 1.899 | (ASP) | 0.503 | Plastic | 1.535 | 56.3 | 2.90 |
| 7 | | −7.639 | (ASP) | 0.308 | | | | |
| 8 | Lens 4 | −0.833 | (ASP) | 0.240 | Plastic | 1.608 | 25.7 | −2.58 |
| 9 | | −1.973 | (ASP) | 0.040 | | | | |
| 10 | Lens 5 | 9.467 | (ASP) | 0.628 | Plastic | 1.530 | 55.8 | 1.94 |
| 11 | | −1.125 | (ASP) | 0.035 | | | | |
| 12 | Lens 6 | 1.770 | (ASP) | 0.562 | Plastic | 1.535 | 56.3 | −3.68 |
| 13 | | 0.828 | (ASP) | 0.800 | | | | |
| 14 | IR-cut filter | Plano | | 0.200 | Glass | 1.517 | 64.2 | — |
| 15 | | Plano | | 0.234 | | | | |
| 16 | Image | Plano | | — | | | | |

Note:
Reference wavelength (d-line) is 587.6 nm.

TABLE 12

Aspheric Coefficients

| | Surface # | | | | | |
|---|---|---|---|---|---|---|
| | 2 | 3 | 4 | 5 | 6 | 7 |
| k = | −1.5861E+01 | 3.9355E−01 | −4.1753E+00 | −1.1038E+01 | −6.2262E+00 | −3.0000E+01 |
| A4 = | −4.1019E−02 | −5.3406E−01 | −2.6421E−01 | −2.4745E−01 | −1.6130E−01 | 2.3409E−02 |
| A6 = | 1.3503E−01 | 8.2411E−01 | 8.3431E−01 | 3.3300E−01 | −3.5151E−02 | −2.2079E−01 |
| A8 = | −1.3108E−01 | −1.2546E+00 | −1.2564E+00 | −4.5103E−01 | −5.7648E−02 | −1.4521E−02 |
| A10 = | −1.5676E+00 | 8.0106E−02 | −7.4542E−01 | 3.1030E−01 | −8.6354E−02 | −1.3994E−02 |
| A12 = | 3.7166E+00 | 6.6949E−01 | 3.6890E+00 | −2.7082E−01 | 2.0927E−01 | 7.6719E−02 |
| A14 = | −2.7522E+00 | −3.4243E−01 | −3.3569E+00 | 4.4876E−02 | −5.0723E−02 | 6.6261E−03 |

| | Surface # | | | | | |
|---|---|---|---|---|---|---|
| | 8 | 9 | 10 | 11 | 12 | 13 |
| k = | −1.2357E+00 | −9.2516E−01 | −2.2956E+00 | −3.8372E+00 | −7.8885E+00 | −3.8464E+00 |
| A4 = | 4.5328E−01 | 1.5717E−01 | −1.5807E−01 | −3.8140E−02 | −1.1008E−01 | −7.8848E−02 |
| A6 = | −7.9096E−01 | −2.2311E−01 | 1.8951E−01 | −2.4188E−03 | 3.3376E−02 | 2.7735E−02 |
| A8 = | 1.0881E+00 | 3.4617E−01 | −1.1092E−01 | 1.0919E−01 | −6.4316E−03 | −7.4213E−03 |
| A10 = | −1.0045E+00 | −2.5576E−01 | 1.5829E−02 | −8.5660E−02 | 8.9833E−04 | 1.0635E−03 |
| A12 = | 5.8078E−01 | 1.0100E−01 | 7.7109E−03 | 2.5494E−02 | 1.2510E−04 | −5.0105E−05 |
| A14 = | −1.4339E−01 | −1.7529E−02 | −2.3828E−03 | −2.7538E−03 | −6.1996E−05 | −2.3416E−06 |

In the optical photographing lens system according to the 6th embodiment, the definitions off, f2, f3, f5, f6, f12, f123, f456, Fno, HFOV, R1, R2, R3, R4, R6, R7, R8, R9, R10, R12, ΣAT and Td are the same as those stated in the 1st embodiment with corresponding values for the 6th embodiment. Moreover, these parameters can be calculated from Table 11 and Table 12 as the following values and satisfy the following relationships:

| f [mm] | 2.78 | R12/f | 0.30 |
|---|---|---|---|
| Fno | 2.20 | f/f12 | 0.17 |
| HFOV [deg.] | 43.4 | f/f2 | 0.45 |
| \|(R1 − R2)/(R1 + R2)\| + \|(R3 − R4)/(R3 + R4)\| | 0.36 | \|f3/f2\| | 0.47 |
| \|R7/R6\| | 0.11 | f123/f456 | −0.02 |
| \|(R7 − R8)/(R7 + R8)\| | 0.41 | f/f5 − f/f6 | 2.19 |
| \|R10/R9\| | 0.12 | ΣAT/Td | 0.195 |

7th Embodiment

Figure 7A:
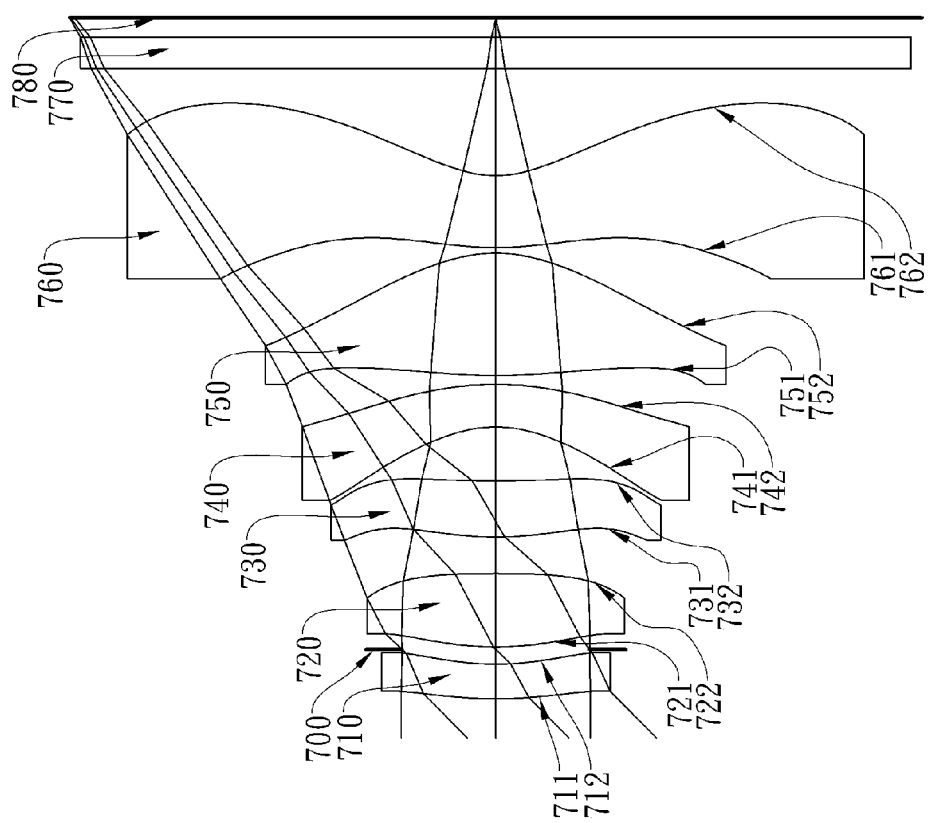
FIG. 7A is a schematic view of an optical photographing lens system according to the 7th embodiment of the present disclosure.
Figure 7B:
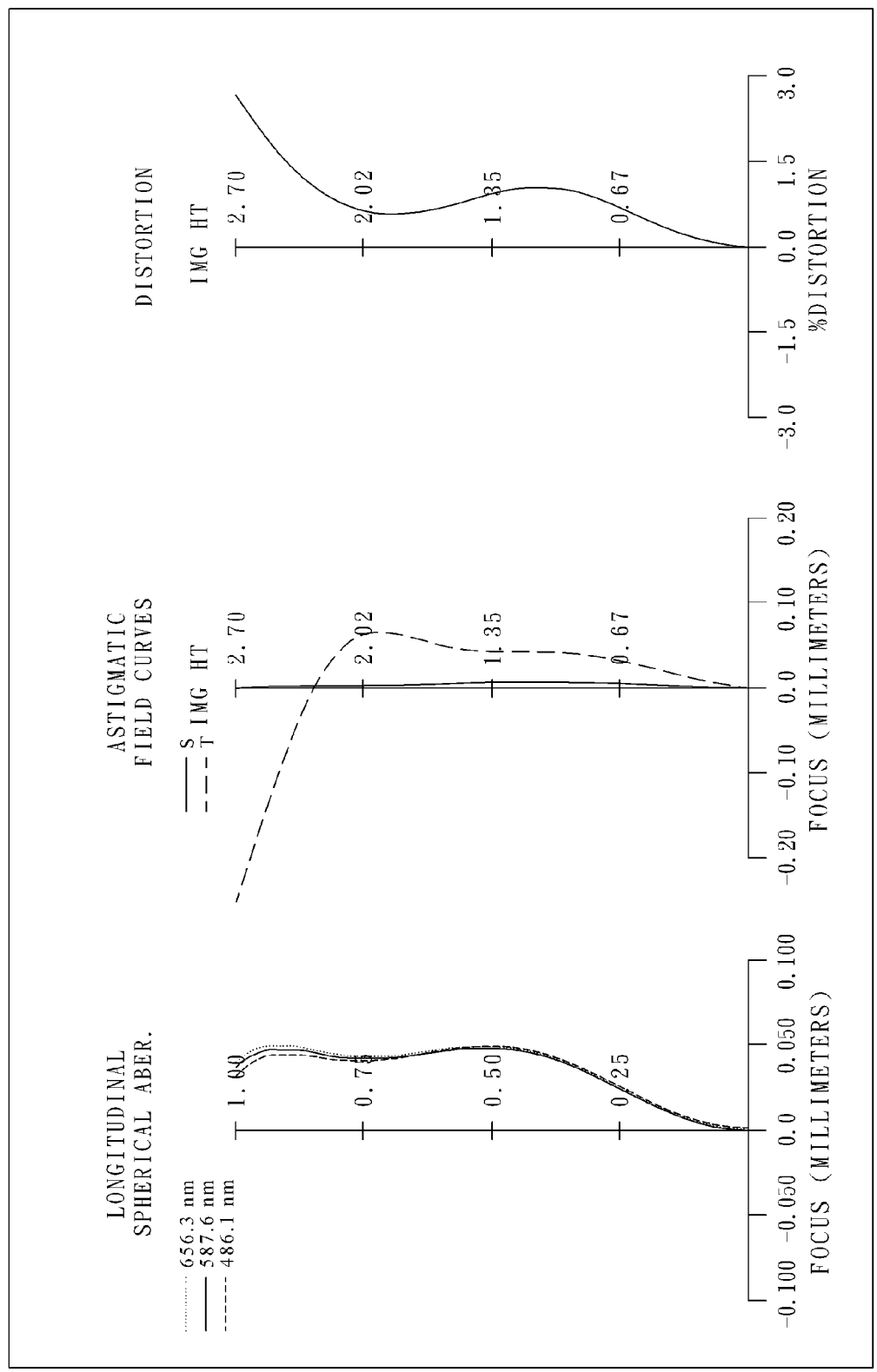
FIG. 7B shows spherical aberration curves, astigmatic field curves and a distortion curve of the optical photographing lens system according to the 7th embodiment.

FIG. 7A is a schematic view of an optical photographing lens system according to the 7th embodiment of the present disclosure. FIG. 7B shows spherical aberration curves, astigmatic field curves and a distortion curve of the optical photographing lens system according to the 7th embodiment. In FIG. 7A, the optical photographing lens system includes, in order from an object side to an image side, a first lens element 710, an aperture stop 700, a second lens element 720, a third lens element 730, a fourth lens element 740, a fifth lens element 750, a sixth lens element 760, an IR-cut filter 770 and an image plane 780.

The first lens element 710 made of plastic material has negative refractive power. The first lens element 710 has a convex object-side surface 711 and a concave image-side surface 712, and both the object-side surface 711 and the image-side surface 712 thereof are aspheric.

The second lens element 720 made of plastic material has positive refractive power. The second lens element 720 has a convex object-side surface 721 and a convex image-side surface 722; both the object-side surface 721 and the image-side surface 722 thereof are aspheric. Furthermore, the object-side surface 721 of the second lens element 720 has at least one inflection point.

The third lens element 730 made of plastic material has positive refractive power. The third lens element 730 has a convex object-side surface 731 and a concave image-side surface 732. Both the object-side surface 731 and the image-side surface 732 of the third lens element 730 are aspheric.

The fourth lens element 740 made of plastic material has negative refractive power. The fourth lens element 740 has a concave object-side surface 741 and a convex image-side surface 742, and both the object-side surface 741 and the image-side surface 742 thereof are aspheric.

The fifth lens element 750 made of plastic material has positive refractive power. The fifth lens element 750 has a convex object-side surface 751 and a convex image-side surface 752, and both the object-side surface 751 and the image-side surface 752 thereof are aspheric.

The sixth lens element 760 made of plastic material has negative refractive power. The sixth lens element 760 has a convex object-side surface 761, and has a concave image-side surface 762 changing from concave at a paraxial region to convex at a peripheral region. Both the object-side surface 761 and the image-side surface 762 of the sixth lens element 760 are aspheric. Furthermore, the negative refractive power of the sixth lens element 760 becomes weak from the paraxial region to the peripheral region.

The IR-cut filter 770 made of glass material is located between the sixth lens element 760 and the image plane 780, and will not affect a focal length of the optical photographing lens system.

The detailed optical data of the 7th embodiment are shown in Table 13, and the aspheric surface data are shown in Table 14 below.

TABLE 13

7th Embodiment
f = 2.65 mm, Fno = 2.20, HFOV = 44.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.355 | (ASP) | 0.220 | Plastic | 1.583 | 30.2 | −8.86 |
| 2 | | 1.562 | (ASP) | 0.095 | | | | |
| 3 | Ape. Stop | Plano | | 0.015 | | | | |
| 4 | Lens 2 | 1.820 | (ASP) | 0.466 | Plastic | 1.530 | 55.8 | 3.07 |
| 5 | | −13.839 | (ASP) | 0.233 | | | | |
| 6 | Lens 3 | 1.984 | (ASP) | 0.357 | Plastic | 1.543 | 56.5 | 4.97 |
| 7 | | 6.983 | (ASP) | 0.344 | | | | |
| 8 | Lens 4 | −0.793 | (ASP) | 0.271 | Plastic | 1.632 | 23.4 | −2.41 |
| 9 | | −1.879 | (ASP) | 0.055 | | | | |
| 10 | Lens 5 | 3.206 | (ASP) | 0.779 | Plastic | 1.514 | 56.8 | 1.50 |
| 11 | | −0.928 | (ASP) | 0.035 | | | | |
| 12 | Lens 6 | 1.984 | (ASP) | 0.458 | Plastic | 1.543 | 56.5 | −2.09 |
| 13 | | 0.663 | (ASP) | 0.680 | | | | |
| 14 | IR-cut filter | Plano | | 0.200 | Glass | 1.517 | 64.2 | — |
| 15 | | Plano | | 0.126 | | | | |
| 16 | Image | Plano | | — | | | | |

Note:
Reference wavelength (d-line) is 587.6 nm.

TABLE 14

Aspheric Coefficients

| | \multicolumn{6}{c}{Surface #} |
|---|---|---|---|---|---|---|
| | 1 | 2 | 4 | 5 | 6 | 7 |
| k = | −2.5499E+01 | 7.4238E−01 | −1.9010E+00 | 3.0000E+00 | −5.4738E+00 | −3.0000E+01 |
| A4 = | −8.0964E−02 | −5.1886E−01 | −2.6405E−01 | −3.3119E−01 | −1.8193E−01 | −1.0934E−02 |
| A6 = | 7.9430E−02 | 7.4932E−01 | 6.2672E−01 | 2.6510E−01 | −7.3299E−02 | −2.3503E−01 |
| A8 = | −1.0736E−01 | −1.3842E+00 | −1.1857E+00 | −3.9701E−01 | −7.2506E−02 | −2.4757E−03 |
| A10 = | −1.4677E+00 | 6.4767E−01 | −6.3049E−01 | 2.7648E−01 | −6.8043E−02 | −1.3548E−03 |
| A12 = | 3.7323E+00 | 4.2108E−01 | 3.6998E+00 | −2.6091E−01 | 2.1137E−01 | 6.8763E−02 |
| A14 = | −2.7113E+00 | −3.9048E−01 | −3.3184E+00 | 6.1624E−02 | −5.2655E−02 | −6.9943E−03 |

| | \multicolumn{6}{c}{Surface #} |
|---|---|---|---|---|---|---|
| | 8 | 9 | 10 | 11 | 12 | 13 |
| k = | −1.1164E+00 | 9.8599E−02 | −9.3158E+00 | −3.9561E+00 | −1.7986E+01 | −3.8861E+00 |
| A4 = | 4.4428E−01 | 1.5023E−01 | −1.9073E−01 | −5.2170E−02 | −1.3940E−01 | −8.7255E−02 |
| A6 = | −7.8722E−01 | −2.3570E−01 | 1.9809E−01 | −1.3589E−02 | 4.2326E−02 | 2.9963E−02 |
| A8 = | 1.0795E+00 | 3.4318E−01 | −1.0799E−01 | 1.0671E−01 | −5.2748E−03 | −6.7074E−03 |
| A10 = | −1.0099E+00 | −2.5470E−01 | 1.1991E−02 | −8.4598E−02 | 2.2145E−04 | 8.1031E−04 |
| A12 = | 5.7929E−01 | 1.0088E−01 | 6.9830E−03 | 2.5655E−02 | 2.1452E−05 | −4.2624E−05 |
| A14 = | −1.3975E−01 | −1.7744E−02 | −2.4603E−03 | −2.5662E−03 | −1.7359E−05 | −1.1602E−07 |

In the optical photographing lens system according to the 7th embodiment, the definitions off, f2, f3, f5, f6, f12, f123, f456, Fno, HFOV, R1, R2, R3, R4, R6, R7, R8, R9, R10, R12, ΣAT and Td are the same as those stated in the 1st embodiment with corresponding values for the 7th embodiment. Moreover, these parameters can be calculated from Table 13 and Table 14 as the following values and satisfy the following relationships:

| f [mm] | 2.65 | R12/f | 0.25 |
|---|---|---|---|
| Fno | 2.20 | f/f12 | 0.55 |
| HFOV [deg.] | 44.5 | f/f2 | 0.86 |
| |(R1 − R2)/(R1 + R2)| + |(R3 − R4)/(R3 + R4)| | 1.51 | |f3/f2| | 1.62 |
| |R7/R6| | 0.11 | f123/f456 | −0.03 |
| |(R7 − R8)/(R7 + R8)| | 0.41 | f/f5 − f/f6 | 3.03 |
| |R10/R9| | 0.29 | ΣAT/Td | 0.233 |

8th Embodiment

Figure 8B:
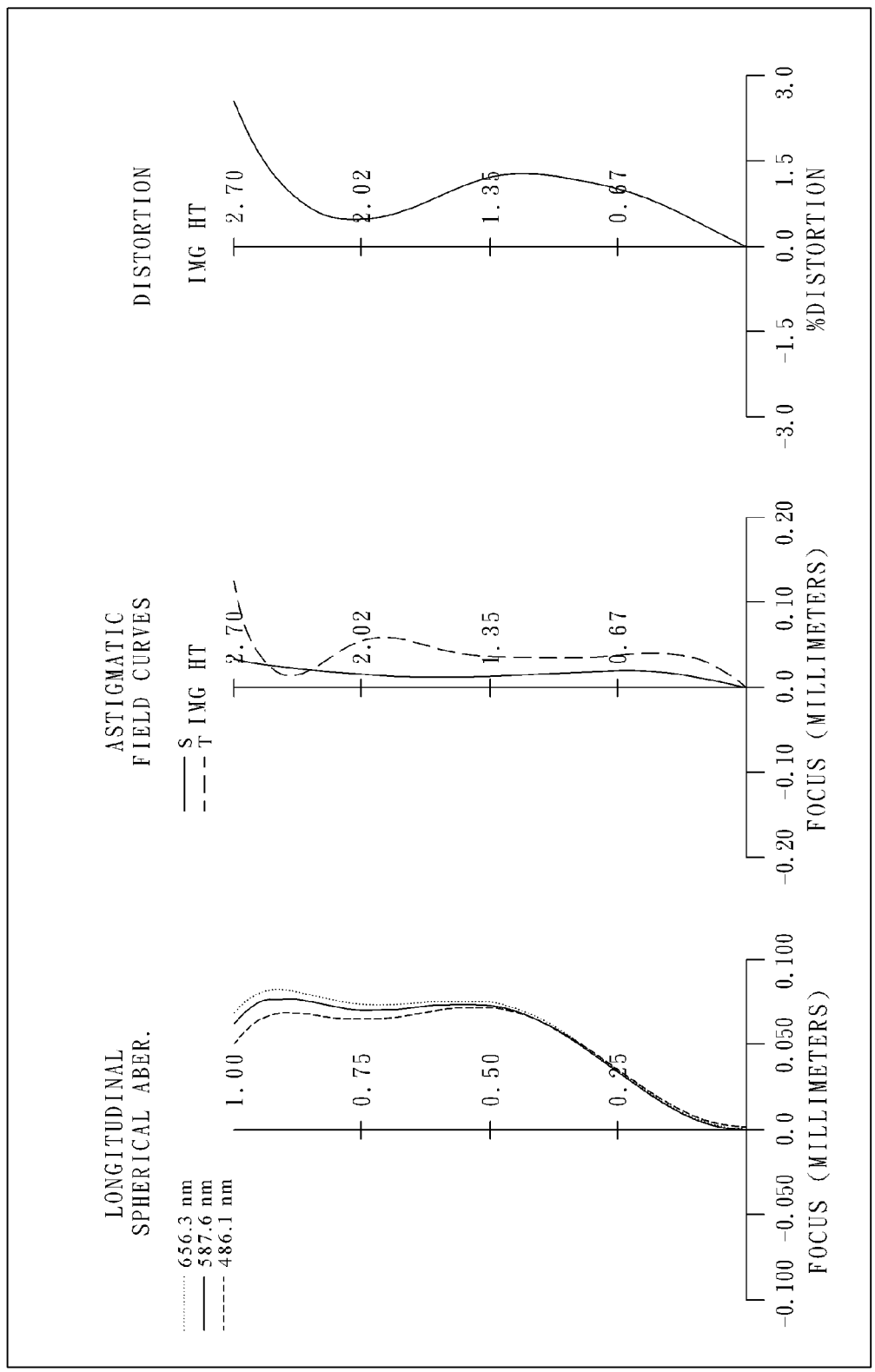
FIG. 8B shows spherical aberration curves, astigmatic field curves and a distortion curve of the optical photographing lens system according to the 8th embodiment.

FIG. 8A is a schematic view of an optical photographing lens system according to the 8th embodiment of the present disclosure. FIG. 8B shows spherical aberration curves, astigmatic field curves and a distortion curve of the optical photographing lens system according to the 8th embodiment. In FIG. 8A, the optical photographing lens system includes, in order from an object side to an image side, an aperture stop 800, a first lens element 810, a second lens element 820, a third lens element 830, a fourth lens element 840, a fifth lens element 850, a sixth lens element 860, an IR-cut filter 870 and an image plane 880.

The first lens element 810 made of plastic material has negative refractive power. The first lens element 810 has a convex object-side surface 811 and a concave image-side surface 812, and both the object-side surface 811 and the image-side surface 812 thereof are aspheric.

The second lens element 820 made of plastic material has positive refractive power. The second lens element 820 has a convex object-side surface 821 and a concave image-side surface 822; both the object-side surface 821 and the image-side surface 822 thereof are aspheric. Furthermore, the object-side surface 821 and the image-side surface 822 of the second lens element 820 both have at least one inflection point.

The third lens element 130 made of plastic material has positive refractive power. The third lens element 130 has a convex object-side surface 131 and a concave image-side surface 132. Both the object-side surface 131 and the image-side surface 832 of the third lens element 830 are aspheric.

The fourth lens element 840 made of plastic material has negative refractive power. The fourth lens element 840 has a concave object-side surface 841 and a convex image-side surface 842, and both the object-side surface 841 and the image-side surface 842 thereof are aspheric.

The fifth lens element 850 made of plastic material has positive refractive power. The fifth lens element 850 has a convex object-side surface 851 and a convex image-side surface 852, and both the object-side surface 851 and the image-side surface 852 thereof are aspheric.

The sixth lens element 860 made of plastic material has negative refractive power. The sixth lens element 860 has a convex object-side surface 861, and has a concave image-side surface 862 changing from concave at a paraxial region to convex at a peripheral region. Both the object-side surface 861 and the image-side surface 862 of the sixth lens element 860 are aspheric. Furthermore, the negative refractive power of the sixth lens element 860 becomes weak from the paraxial region to the peripheral region.

The IR-cut filter 870 made of glass material is located between the sixth lens element 860 and the image plane 880, and will not affect a focal length of the optical photographing lens system.

The detailed optical data of the 8th embodiment are shown in Table 15, and the aspheric surface data are shown in Table 16 below.

TABLE 15

8th Embodiment
f = 2.73 mm, Fno = 2.20, HFOV = 43.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.043 | | | | |
| 2 | Lens 1 | 2.188 | (ASP) | 0.220 | Plastic | 1.640 | 23.3 | −9.76 |
| 3 | | 1.557 | (ASP) | 0.115 | | | | |
| 4 | Lens 2 | 1.451 | (ASP) | 0.449 | Plastic | 1.530 | 55.8 | 4.08 |
| 5 | | 3.934 | (ASP) | 0.175 | | | | |
| 6 | Lens 3 | 1.708 | (ASP) | 0.382 | Plastic | 1.514 | 56.8 | 4.23 |
| 7 | | 7.389 | (ASP) | 0.340 | | | | |
| 8 | Lens 4 | −0.922 | (ASP) | 0.240 | Plastic | 1.608 | 25.7 | −2.70 |
| 9 | | −2.309 | (ASP) | 0.040 | | | | |
| 10 | Lens 5 | 3.292 | (ASP) | 0.749 | Plastic | 1.514 | 56.8 | 1.68 |
| 11 | | −1.078 | (ASP) | 0.035 | | | | |
| 12 | Lens 6 | 1.493 | (ASP) | 0.461 | Plastic | 1.530 | 55.8 | −2.67 |
| 13 | | 0.649 | (ASP) | 0.600 | | | | |
| 14 | IR-cut filter | Plano | | 0.200 | Glass | 1.517 | 64.2 | — |
| 15 | | Plano | | 0.325 | | | | |
| 16 | Image | Plano | | — | | | | |

Note:
Reference wavelength (d-line) is 587.6 nm.

TABLE 16

Aspheric Coefficients

| | Surface # | | | | | |
|---|---|---|---|---|---|---|
| | 2 | 3 | 4 | 5 | 6 | 7 |
| k = | −1.9042E+01 | 4.5724E−01 | −3.1155E+00 | −2.8817E+01 | −5.8749E+00 | −2.7982E+01 |
| A4 = | −4.6603E−02 | −5.2865E−01 | −2.7417E−01 | −3.1153E−01 | −1.7716E−01 | 5.5453E−03 |
| A6 = | 1.3098E−01 | 7.8106E−01 | 7.6580E−01 | 3.1920E−01 | −6.9290E−02 | −2.4177E−01 |
| A8 = | −1.3747E−01 | −1.1086E+00 | −1.1506E+00 | −3.9156E−01 | −7.8192E−02 | −1.0013E−02 |
| A10 = | −1.5392E+00 | −5.1631E−02 | −7.5379E−01 | 2.9347E−01 | −8.1460E−02 | −9.0262E−03 |
| A12 = | 3.7166E+00 | 6.6949E−01 | 3.6890E+00 | −2.7082E−01 | 2.1187E−01 | 7.0390E−02 |
| A14 = | −2.7522E+00 | −3.4243E−01 | −3.3569E+00 | 4.4876E−02 | −5.2461E−02 | −6.3066E−03 |

| | Surface # | | | | | |
|---|---|---|---|---|---|---|
| | 8 | 9 | 10 | 11 | 12 | 13 |
| k = | −1.2151E+00 | −1.6234E−01 | −9.5199E+00 | −3.8164E+00 | −1.3477E+01 | −3.7070E+00 |
| A4 = | 4.4987E−01 | 1.4394E−01 | −1.8347E−01 | −3.9202E−02 | −1.3772E−01 | −8.9434E−02 |
| A6 = | −7.9829E−01 | −2.3187E−01 | 2.0193E−01 | −1.1033E−02 | 4.5960E−02 | 3.1112E−02 |
| A8 = | 1.0768E+00 | 3.4420E−01 | −1.0937E−01 | 1.0700E−01 | −5.2988E−03 | −7.1786E−03 |
| A10 = | −1.0118E+00 | −2.5432E−01 | 1.1732E−02 | −8.4735E−02 | 4.6737E−05 | 8.8687E−04 |

TABLE 16-continued

| Aspheric Coefficients | | | | | | |
|---|---|---|---|---|---|---|
| A12 = | 5.7814E−01 | 1.0178E−01 | 7.0583E−03 | 2.5549E−02 | 1.3749E−05 | −3.9331E−05 |
| A14 = | −1.3660E−01 | −1.7554E−02 | −2.1035E−03 | −2.6502E−03 | 3.9169E−07 | −7.6764E−07 |

In the optical photographing lens system according to the 8th embodiment, the definitions off, f2, f3, f5, f6, f12, f123, f456, Fno, HFOV, R1, R2, R3, R4, R6, R7, R8, R9, R10, R12, ΣAT and Td are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f [mm] | 2.73 | R12/f | 0.24 |
| Fno | 2.20 | f/f12 | 0.36 |
| HFOV [deg.] | 43.5 | f/f2 | 0.67 |
| \|(R1 − R2)/(R1 + R2)\| + \|(R3 − R4)/(R3 + R4)\| | 0.63 | \|f3/f2\| | 1.04 |
| \|R7/R6\| | 0.12 | f123/f456 | 0.07 |
| \|(R7 − R8)/(R7 + R8)\| | 0.43 | f/f5 − f/f6 | 2.65 |
| \|R10/R9\| | 0.33 | ΣAT/Td | 0.220 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical photographing lens system comprising, in order from an object side to an image side:
    a first lens element with negative refractive power having a convex object-side surface and a concave image-side surface;
    a second lens element having positive refractive power;
    a third lens element having refractive power;
    a fourth lens element having refractive power, wherein at least one of an object-side surface and an image-side surface of the fourth lens element is aspheric;
    a fifth lens element with positive refractive power having a convex image-side surface, wherein an object-side surface and the image-side surface of the fifth lens element are aspheric; and
    a sixth lens element having negative refractive power, wherein an image-side surface changes from concave at a paraxial region to convex at a peripheral region, and an object-side surface and the image-side surface of the sixth lens element are aspheric;
    wherein a focal length of the optical photographing lens system is f, a focal length of the second lens element is f2, a curvature radius of the object-side surface of the fifth lens element is R9, and a curvature radius of the image-side surface of the fifth lens element is R10, the following relationships are satisfied:

$0 < f/f2 < 1.0$; and $|R10/R9| < 0.9$.

2. The optical photographing lens system of claim 1, wherein the fourth lens element has negative refractive power.

3. The optical photographing lens system of claim 2, wherein the fourth lens element has a concave object-side surface and a convex image-side surface.

4. The optical photographing lens system of claim 3, wherein the third lens element has positive refractive power.

5. The optical photographing lens system of claim 4, wherein the second lens element has a convex object-side surface.

6. The optical photographing lens system of claim 5, wherein the focal length of the optical photographing lens system is f, and a composite focal length of the first lens element and the second lens element is f12, and the following relationship is satisfied:

$0 < f/f12 < 0.6$.

7. The optical photographing lens system of claim 5, wherein a curvature radius of an image-side surface of the third lens element is R6, and a curvature radius of an object-side surface of the fourth lens element is R7, the following relationship is satisfied:

$|R7/R6| < 0.5$.

8. The optical photographing lens system of claim 5, wherein a composite focal length of the first lens element, the second lens element and the third lens element is f123, and a composite focal length of the fourth lens element, the fifth lens element and the sixth lens element is f456, the following relationship is satisfied:

$-1 < f123/f456 < 0.3$.

9. The optical photographing lens system of claim 5, wherein the negative refractive power of the sixth lens element becomes weak from the paraxial region to the peripheral region.

10. The optical photographing lens system of claim 2, wherein a focal length of the first lens element is f1, the focal length of the second lens element is f2, and a focal length of the third lens element is f3, the following relationship is satisfied:

$|f1| > |f2| > |f3|$.

11. The optical photographing lens system of claim 10, wherein the second lens element has a concave image-side surface.

12. The optical photographing lens system of claim 11, wherein the third lens element has a convex object-side surface and a convex image-side surface.

13. The optical photographing lens system of claim 10, wherein the sixth lens element has a convex object-side surface.

14. The optical photographing lens system of claim 10, wherein the second lens element has at least one inflection point formed on at least one of the object-side surface and the image-side surface thereof.

15. The optical photographing lens system of claim 10, wherein a curvature radius of the object-side surface of the fourth lens element is R7, and a curvature radius of the image-side surface of the fourth lens element is R8, the following relationship is satisfied:

$0.1 < |(R7-R8)/(R7+R8)| < 0.55$.

16. The optical photographing lens system of claim 3, wherein a total axial distance of the air intervals between every lens element with refractive power is ΣAT, and an axial distance between the object-side surface of the first lens element and the image-side surface of the sixth lens element is Td, the following relationship is satisfied:

$$0 < \Sigma AT/Td < 0.30.$$

17. The optical photographing lens system of claim 16, wherein the focal length of the optical photographing lens system is f, a focal length of the fifth lens element is f5, and a focal length of the sixth lens element is f6, the following relationship is satisfied:

$$2.0 < f/f5 - f/f6 < 5.5.$$

18. The optical photographing lens system of claim 16, wherein the focal length of the second lens element is f2, and a focal length of the third lens element is f3, the following relationship is satisfied:

$$0.2 < |f3/f2| < 0.7.$$

19. The optical photographing lens system of claim 16, wherein the curvature radius of the object-side surface of the fifth lens element is R9, and the curvature radius of the image-side surface of the fifth lens element is R10, the following relationship is satisfied:

$$|R10/R9| < 0.4.$$

20. The optical photographing lens system of claim 16, wherein a curvature radius of an object-side surface of the first lens element is R1, a curvature radius of an image-side surface of the first lens element is R2, a curvature radius of an object-side surface of the second lens element is R3, and a curvature radius of an image-side surface of the second lens element is R4, the following relationship is satisfied:

$$0.10 < |(R1-R2)/(R1+R2)| + |(R3-R4)/(R3+R4)| < 0.45.$$

21. The optical photographing lens system of claim 16, wherein a curvature radius of the image-side surface of the sixth lens element is R12, and the focal length of the optical photographing lens system is f, the following relationship is satisfied:

$$0.10 < R12/f < 0.50.$$

22. The optical photographing lens system of claim 1, wherein a total axial distance of the air intervals between every lens element with refractive power is ΣAT, and an axial distance between the object-side surface of the first lens element and the image-side surface of the sixth lens element is Td, the following relationship is satisfied:

$$0 < \Sigma AT/Td < 0.25.$$

* * * * *